United States Patent
Jones et al.

(10) Patent No.: US 10,445,718 B2
(45) Date of Patent: Oct. 15, 2019

(54) PROCESSING A TRANSACTION USING MULTIPLE APPLICATION IDENTIFIERS

(71) Applicant: VISA INTERNATIONAL SERVICE ASSOCIATION, San Francisco, CA (US)

(72) Inventors: Christopher Jones, Greenbrae, CA (US); Christian Aabye, Foster City, CA (US); Oleg Makhotin, Castro Valley, CA (US)

(73) Assignee: Visa International Service Association, San Francisco, CA (US)

( * ) Notice: Subject to any disclaimer, the term of this patent is extended or adjusted under 35 U.S.C. 154(b) by 748 days.

(21) Appl. No.: 14/585,093

(22) Filed: Dec. 29, 2014

(65) Prior Publication Data
US 2015/0186864 A1  Jul. 2, 2015

Related U.S. Application Data

(60) Provisional application No. 61/921,381, filed on Dec. 27, 2013.

(51) Int. Cl.
| | |
|---|---|
| *G06Q 20/22* | (2012.01) |
| *G06Q 20/32* | (2012.01) |
| *G06Q 20/40* | (2012.01) |
| *G06Q 20/34* | (2012.01) |

(52) U.S. Cl.
CPC ......... *G06Q 20/322* (2013.01); *G06Q 20/227* (2013.01); *G06Q 20/3278* (2013.01); *G06Q 20/3572* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 7,155,411 B1 * | 12/2006 | Blinn | G06Q 20/02 705/1.1 |
| 8,799,087 B2 | 8/2014 | Martin et al. | |
| 8,807,440 B1 | 8/2014 | von Behren | |
| 2011/0244796 A1 | 10/2011 | Khan et al. | |
| 2011/0251892 A1 * | 10/2011 | Laracey | G06Q 30/0253 705/14.51 |
| 2012/0136752 A1 * | 5/2012 | Gupta | G06Q 20/10 705/26.8 |

(Continued)

*Primary Examiner* — Joseph W. King
(74) *Attorney, Agent, or Firm* — Kilpatrick Townsend & Stockton LLP

(57) ABSTRACT

Embodiments of the present invention are directed to methods, systems, apparatuses, and computer-readable mediums for selecting multiple payment applications and preparing multiple transaction payloads for a transaction during interaction between a mobile device and an access device. Accordingly, by preparing multiple transaction payloads for a single transaction, a merchant may initiate transactions using each of the prepared transaction payloads in order of preference. If a transaction initiated using payment credentials associated with a preferred application is unsuccessful for any reason, a transaction may be initiated using payment credentials associated with an alternate application automatically, and without additional interaction by the mobile device and/or access device.

20 Claims, 9 Drawing Sheets

(56) References Cited

U.S. PATENT DOCUMENTS

| | | | |
|---|---|---|---|
| 2013/0054474 A1* | 2/2013 | Yeager | G06Q 20/3223 |
| | | | 705/71 |
| 2013/0073744 A1* | 3/2013 | Ratica | G06F 9/4451 |
| | | | 709/240 |
| 2014/0101036 A1* | 4/2014 | Phillips | G06Q 20/027 |
| | | | 705/39 |
| 2014/0188713 A1 | 7/2014 | Alimi | |
| 2014/0279502 A1* | 9/2014 | Dooley | G06Q 20/12 |
| | | | 705/44 |

* cited by examiner

PROCESSING A TRANSACTION USING MULTIPLE APPLICATION IDENTIFIERS

CROSS-REFERENCES TO RELATED APPLICATIONS

This application is a non-provisional of and claims the benefit of priority to U.S. Provisional Application No. 61/921,381 filed Dec. 27, 2013, which is hereby incorporated by reference in its entirety for all purposes.

BACKGROUND

Consumers are increasingly using their mobile devices to initiate payment transactions at merchants and other service providers. For example, a consumer may have credit card and debit card account information provisioned onto their mobile phone. The mobile phone may be used to initiate a transaction at a merchant. For instance, the consumer may be able to use their phone to initiate a transaction at a point-of-sale (POS) device by passing payment information associated with the provisioned credit or debit card accounts to a contactless reader over a short-range communication channel.

Each card account provisioned to the phone may have a different payment application associated with it. Each mobile payment application may be stored in a secure memory and may be identified by an application identifier (AID) that is passed to the POS during a transaction. The POS may select an application identifier to obtain the payment information associated with the selected account from the phone. For example, a credit card account and a debit card account that is provisioned to a phone may have a first application identifier (AID) and a second application identifier (AID), respectively. The credit card account information and the debit card account information may be stored in separate payment applications in a secure memory of the mobile device. The application identifier may identify the payment application where the account information may be obtained for a selected account. Accordingly, during transaction processing, a POS that determines that the transaction should be initiated using the credit card account may send a selection of an application identifier associated with the application that is storing the credit card account information.

Each payment application may include different authentication options, processing capabilities, and loyalty and/or cardholder benefit options. Accordingly, consumers and merchants may have different interests and motivations for selecting a particular payment application for use in a transaction. Thus, the application identifier (and provisioned account information) ultimately used to conduct a payment transaction may depend on the preferences of the merchant, user, and/or payment application.

Furthermore, the amount of time that elapses during a short range communication interaction between a phone and a POS is very short. The time of the interaction is short to ensure the information exchange and/or transaction preparation is completed before a consumer moves the phone out of communication range with the POS. Additionally, the short communication period enhances the consumer experience since they are not forced to hold their phone within the short communication range of the POS for a long period of time.

The amount of time that a near-field communication (NFC) interaction may take can include the amount of time that it takes for a consumer to move their phone to an NFC reader of a POS and then away from it. As such, the consumer is not required to hold their phone to the POS for any period of time and no partial exchange or transaction preparation occurs because the interaction is completed before a user can remove their phone.

However, because the interaction is so short, the transaction may not be completed by the time the mobile device is moved outside of communication range with the POS. Thus, if a transaction is unsuccessful for any reason, there is no ability for the POS to obtain additional payment information from the phone. Accordingly, the transaction would have to be re-initiated and a consumer would be forced to place their phone close to the POS again to initiate a transaction using a different payment application and/or payment credentials. This can be inconvenient and time consuming for the consumer and merchant. Additionally, a consumer may have to select a new application for payment through the phone and/or may have to change settings on their phone before re-initiating the transaction.

Accordingly, with the emergence of payment applications with multiple different processing options, associated with different entities, providing different benefits, etc., a more flexible system is required to address the growing mobile payment application environment. Thus, a need exists for consumers, merchants, wallet providers, and other interested parties to a transaction to have multiple options for transaction processing without requiring additional inefficient and time-consuming merchant and/or consumer interaction.

Embodiments of the invention address these and other problems, individually and collectively.

SUMMARY

Embodiments of the present invention provide for methods, devices, and systems of selecting multiple payment applications and preparing multiple transaction payloads for a transaction during interaction between a mobile device and an access device. Accordingly, by preparing multiple transaction payloads for a single transaction, the merchant may initiate transactions using each of the prepared transaction payloads in order of preference and no additional input or interaction is required by a consumer, mobile device, and/or access device. For example, if a transaction initiated using payment credentials associated with a preferred application is unsuccessful for any reason, a secondary transaction may be initiated using payment credentials associated with a secondary application automatically, and without additional action by the consumer and/or merchant.

One embodiment of the invention is directed to a method for processing a transaction initiated by a mobile device communicating with an access device. The method includes an access device receiving a plurality of application identifiers from the mobile device. The plurality of application identifiers may be associated with one or more payment credentials provisioned on the mobile device. The method further includes determining a first application identifier and a second application identifier from the plurality of application identifiers for the transaction and preparing a first transaction payload including first payment credentials associated with the first application identifier and a second transaction payload including second payment credentials associated with the second application identifier. The method further comprises initiating a first transaction using the first transaction payload, storing the second transaction payload in a temporary memory, determining that the first transaction should not or cannot be completed and initiating a second transaction using the stored second transaction payload from the temporary memory.

Another embodiment of the invention is directed to an access device comprising a processor and a computer-readable medium coupled to the processor. The computer readable medium may include code, executable by the processor, for performing a method for processing a transaction initiated by a mobile device communicating with the access device. The method includes receiving a plurality of application identifiers from the mobile device. The plurality of application identifiers may be associated with one or more payment credentials provisioned on the mobile device. The method further includes determining a first application identifier and a second application identifier from the plurality of application identifiers for the transaction and preparing a first transaction payload including first payment credentials associated with the first application identifier and a second transaction payload including second payment credentials associated with the second application identifier. The method further comprises initiating a first transaction using the first transaction payload, storing the second transaction payload in a temporary memory, determining that the first transaction should not or cannot be completed and initiating a second transaction using the stored second transaction payload from the temporary memory.

Another embodiment of the invention is directed to a system for processing payment transactions initiated by a mobile device communicating with an access device where the system includes the mobile device and the access device. The mobile device being configured to send a plurality of application identifiers to the access device. The plurality of application identifiers being associated with two or more payment credentials stored on the mobile device. The access device being configured to receive the plurality of application identifiers from the mobile device, determine a first and a second application identifier for the transaction, and prepare a first transaction payload including payment credentials associated with the first application identifier and a second transaction payload including payment credentials associated with the second application identifier. The access device being further configured to initiate a first transaction using the first transaction payload, determine that the first transaction should not or cannot be completed, and initiate the second transaction using the second transaction payload.

These and other embodiments of the invention are described in further detail below.

DETAILED DESCRIPTION

Figure 1:
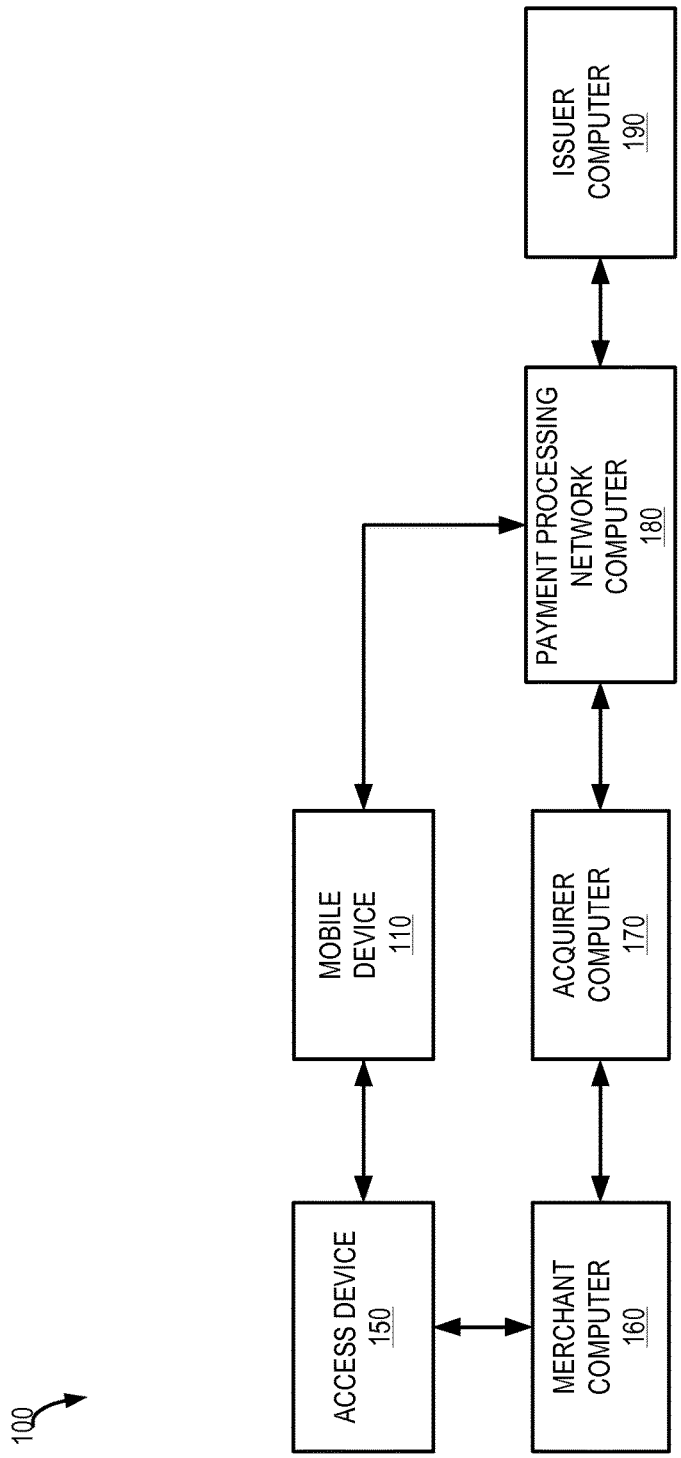
FIG. 1 shows a block diagram illustrating a system for conducting a transaction between a mobile device and an access device, according to an embodiment of the invention.

Embodiments of the present invention provide for methods, devices, and systems of selecting multiple payment applications and preparing multiple transaction payloads for a transaction during interaction between a mobile device and an access device. Accordingly, by preparing multiple transaction payloads for a single transaction, the merchant may initiate transactions using each of the prepared transaction payloads in order of preference and no additional input or interaction is required by a consumer, mobile device, and/or access device. For example, if a transaction initiated using payment credentials associated with a preferred application is unsuccessful for any reason, a secondary transaction may be initiated using payment credentials associated with a secondary application automatically, and without additional action by the consumer and/or merchant.

Each of the transaction payloads may have different cardholder verification methods associated with them, may be processed by different payment networks (and thus may have different fees, processing speeds, configuration options, etc.), and may have different levels of security associated with them. Accordingly, a consumer may determine that they do not wish to initiate a transaction using a first transaction payload associated with a first payment application and may cancel the first transaction. The access device may then initiate a second transaction using a stored secondary transaction payload that has a lower level of authentication, better cardholder loyalty benefits associated with it, and/or any other benefits to the consumer and/or merchant.

For example, a mobile phone may have various card data (e.g., debit card, credit card, etc.) provisioned into multiple payment applications which may be identified by application identifiers (AIDs). An application identifier (AID) identifies a payment application installed on the mobile phone and may also indicate to a POS terminal how a transaction conducted using the corresponding payment application is processed (e.g., what payment network to use to process the transaction (Visa™ vs. MasterCard™, etc.)). Accordingly, during an NFC transaction, a list of AIDs may be transmitted to a POS terminal to allow for the POS terminal to identify what applications are available on the phone. The POS terminal can select a payment application that the POS terminal supports and is configured to process transactions with based on the received AIDs. Where multiple AIDs are supported, the POS terminal may select multiple AIDs such that multiple transaction payloads can be prepared while the phone is in communication with the POS terminal. Thus, if a transaction associated with a preferred application (identified through the preferred AID) is unsuccessful, a transaction associated with the alternate application (identified through the secondary or alternate AID) can be completed without requiring the user to re-initiate a transaction with the POS terminal (e.g., re-tap or re-engage their phone with a contactless reader of the POS terminal).

Accordingly, embodiments allow for the preparation and initiation of multiple transactions during a single interaction between a consumer's payment device and a POS terminal. Thus, embodiments prepare multiple transaction payloads in case there are any problems and/or changes during transaction processing. Thereby allowing the POS terminal to complete at least one alternate transaction when a first transaction fails. Accordingly, embodiments eliminate the need to re-initiate or repeat the mobile device/access device interaction when a first transaction fails.

For example, during a transaction at a merchant, a consumer may use their phone to pay for goods at a merchant POS. The consumer may open a mobile application (e.g., mobile wallet application) on the phone associated with multiple cards that have been provisioned onto the phone. Each of the cards may be provisioned as a separate mobile payment application on the device. The consumer may tap their phone to an NFC reader at the POS. The POS receives payment information comprising multiple AIDs from the phone. The POS determines which AIDs it supports by comparing the list of AIDs to a list of supported AIDs stored in the POS. If there is a match between AIDs, the POS determines that the AID is supported. Where there are multiple supported payment applications, the POS may determine a preferred application for processing the transaction based on a priority order of the supported AIDs and/or relationships between received AIDs.

For instance, one of the supported AIDs may be a common debit AID. A "common debit AID" may include any AID used to indicate that payment credentials associated with the corresponding payment application may be processed using multiple payment networks or a particular group of payment networks. However, the common debit AID may have a particular cardholder verification method (CVM) associated with it that the consumer and/or POS may not desire to use for the transaction.

Accordingly if a common debit AID is identified from the list of AIDs, the POS may determine whether an alternate AID is supported (that may or may not be associated with the same debit card information as the payment application corresponding to the common debit AID) and that may be configured to be processed by a specific payment processing network instead of the generic and/or group of payment processing networks. If so, the POS prepares transaction data using both AIDs.

The POS attempts to complete the preferred common debit transaction first. However, if the transaction fails because, for example, a consumer does not wish to enter a PIN (i.e., the CVM associated with the common debit payment application), the POS completes the transaction using a transaction payload generated using the alternate AID (e.g., the network-specific payment application) which may have a different CVM and thus, may not require a PIN entry. Because the POS has already prepared the second transaction payload, there is no need for the consumer to re-initiate a transaction and/or have the phone interact with the POS again.

Thus, embodiments of the invention allow a transaction to be automatically conducted using payment credentials and/or configuration options associated with an alternate payment application installed on a mobile device without requiring the user to re-present the mobile device. Accordingly, embodiments provide a number of advantages including providing multiple options for consumers to initiate transactions during a short-range communication transaction without requiring multiple interactions with a mobile device. As such, a consumer may be able to interact their device with a POS once, but can have the option to process the transaction using multiple applications stored on the mobile device.

This provides for efficient data communication, additional consumer choice, and time efficiencies because a single interaction between a mobile device and an access device results in multiple transaction payloads that may be initiated for a transaction. Accordingly, consumers and merchants may be provided with additional choice of initiating and processing transactions without worrying about the delay and inconvenience of requiring additional interactions between devices.

Before discussing specific embodiments and examples, some descriptions of terms used herein are provided below.

An "application" may include any software module configured to perform a specific function or functions when executed by a processor of a computer. For example, a "payment application" may include any software, code, application, or any other module that is configured to store and provide payment information for a transaction when executed by a processor. For instance, a payment application may store sensitive payment information (e.g., account identifier, expiration date, card verification value (CVV), etc.) on a secure memory or trusted execution environment (e.g., secure element). The sensitive payment information may be accessed by requesting the payment information from the payment application using an AID or other address information for accessing the correct payment application. Any number of communication protocols may be used to access the payment information from the payment application and use the received payment information in a payment transaction.

"Payment information" may include any data that may be used to identify an account and use the account for a payment transaction. For example, payment information may include payment credentials (e.g., primary account identifier (PAN), expiration date, card verification value (CVV), device authentication information (e.g., transaction cryptogram), dynamic authentication information (e.g., a dynamic cryptogram), etc.), personal information associated with a user or a consumer (e.g., name, billing address, residential address, date of birth, etc.), account information (e.g., issuer identifier (BIN), account issuance date, etc.), cardholder verification information (e.g., passcode, password, personal identification number (PIN), etc.), an indication of an authentication process for transaction processing (e.g., online PIN, signature, etc.) which may also be referred to as a cardholder verification method (CVM), and/or any other suitable or relevant information for performing a transaction.

An "application identifier" (AID) may include any information that may identify an application installed on a device. An AID can be in the form of a set of alphanumeric or numeric characters. In some embodiments, an AID may identify a payment application, and the AID can be associated with a set of features and/or services relating to how a transaction conducted using the corresponding payment application is processed. Furthermore, in some embodiments, the AID may be associated with account information provisioned into the payment application corresponding to the AID.

For instance, an AID may indicate to an access device which payment processing network (e.g., VisaNet™) should be used to process a transaction conducted with the payment application corresponding to the AID; a type of account or financial credentials associated with the payment application (e.g., debit, credit, loyalty, etc.); account-related information (e.g., platinum level account, gold level account, etc.); an account issuer (e.g., Bank A); and/or any other information about a payment application or underlying account data associated with the payment application.

In some embodiments, the AID may have a standardized format to include information about an application provider (e.g., payment network A, merchant B, etc.) and an application type (e.g., account or product type, account issuer, etc.) associated with each payment application. For example, a first portion of an AID may identify an application provider associated with card data provisioned on a device and a second portion may identify an account type associated with the application provider. For instance, the AID (e.g., A000000031010) can have a first portion (e.g., A00000003) that identifies an application provider (e.g., payment network A) and a second portion (e.g., 1010) that identifies a type of account provisioned into the identified payment application (e.g., debit or credit account). Further, in some embodiments, the second portion (or a third portion) could also identify an issuer associated with the provisioned account and/or payment application (e.g., Issuer B). Thus, the AID may be used by the access device to determine if the access device can support processing a transaction initiated using the payment application.

A "first priority application identifier" or "preferred application identifier" may be an AID that has been determined to have the highest priority by an access device. The priority of each AID may be determined through any suitable method. For example, priority of AIDs may be based on consumer input (e.g., a consumer chooses their top three supported payment applications), closest match with configuration options for a device (e.g., applications associated with a preferred type of processing by the device are given priority), transaction security (e.g., applications that require a high level of authentication in order to process a transaction are given higher priority than other applications, payment networks with a better security track-record are provided priority), transaction processing speed (e.g., applications associated with a particular payment network that is faster than other payment networks are given higher priority), and/or any other information or processes may be used to prioritize AIDs associated with applications on the mobile device.

A "network-generic application identifier" or "multiple-network application identifier" may be an application identifier that is associated with a payment application with provisioned payment information that may be routed and/or processed using a variety of different payment networks. For example, in some embodiments, a network-generic AID may correspond to a payment application that includes payment information that may be used by two or more proprietary networks to process a transaction initiated by a payment application identified by the AID. The network-generic AID may identify an application storing network-generic payment information such that the payment credentials and/or account credentials may be recognized and/or processed by multiple payment networks. For instance, a "common debit account identifier" may identify a payment application including provisioned financial account information associated with a consumer's debit account. The common debit account identifier may indicate that the payment information stored in the payment application identified by the common debit account identifier may be processed by multiple debit account processing networks.

Accordingly, in some embodiments, when a consumer provisions a debit account to their payment device, two different payment applications may be installed with payment information associated with the debit account. A first payment application may be identified through a common debit application identifier (AID). The common debit AID may correspond to a payment application that stores payment information that is configured to be processed over multiple payment processors. A second payment application may be identified through a network-specific application identifier (e.g., a VisaNet™ specific AID). Payment processing networks are configured to process particular data formats and identify particular information. Thus, information provided by one network may not be understood by a second network. Accordingly, although both payment applications are associated with the same debit card, the payment information stored by each payment application may be different to allow for the network-generic application (corresponding to the network-generic AID) to be processed through multiple payment networks and the network-specific application (corresponding to the network-specific AID) to be processed by a particular payment network. Thus, the network-generic payment information may include a different format than any of the network-specific payment information. Instead, the payment information may include a format that a group of the payment processing networks have agreed upon, so that they can all process the payment information.

A "network-specific application identifier" may be an AID that is associated with a payment application with payment information that may be routed and/or processed using only a specific payment network. For example, a payment application that is configured to process payments through only one of, for example, VisaNet™, MasterCard™, or American Express™ payment networks may be identified using a network-specific AID. The network-specific AID may identify a payment application storing network-specific payment information such that the payment credentials and/or account credentials may only be recognized by a specific or particular payment network.

A "selection message" may include any data, information, or signal that indicates a selection of one or more options provided to a system. For example, the selection message may be sent from an access device to a mobile device and may include an AID associated with a payment application installed in the mobile device.

A "transaction payload" may include any transaction and/or payment information that may be used to process a transaction. For example, the transaction payload may include payment credentials and/or account information for identifying an account (e.g., account identifier (e.g., PAN), token, expiration date, etc.) and/or for validating the authenticity of a transaction initiated by a mobile device (e.g., card verification values (CVV), cardholder verification results (CVR), validation data, etc.).

"Preparing a transaction payload" may include any process or action to prepare a transaction for processing. For example, preparing a transaction payload may include multiple steps including multiple communication requests and responses being sent between a mobile device and an access device to obtain payment credentials associated with a selected payment application. The received payment credentials and other payment information associated with the payment application may then be used in a transaction.

A "cardholder verification method" (CVM) may include any process for authenticating and/or validating a user. For example, a CVM may include a method of authenticating a consumer during a payment transaction to ensure the consumer is authorized to initiate a transaction using the corresponding account. For example, a CVM may include obtaining a signature, validating a PIN, or obtaining an indication that a mobile device has previously authenticated a user (e.g., through biometrics, passcodes, etc.). Further, CVM methods could include challenge response tests, passcode validation, and/or any other suitable processes for authenticating a consumer.

A "module" may include any component or sub-component of a system. For example, a module may include a software program configured to perform a particular function when executed by a processor.

I. Exemplary Transaction Processing System

Referring now to FIG. 1, a functional block diagram illustrating the primary functional elements of an exemplary transaction processing system according to one embodiment of the present invention. It is to be understood that embodiments of the invention may include more than one of the components shown individually in FIG. 1. Additionally, some embodiments of the invention may include fewer than all of the components shown in FIG. 1.

The exemplary transaction processing system may include a consumer (not shown), a mobile device 110 associated with the consumer (or other account holder), an access device 150, a merchant computer 160, an acquirer computer 170, a payment processing network computer 180, and an issuer computer 190. The various computers may be configured to communicate in any suitable manner using any suitable communication network. Although the entities are shown as coupled to particular entities, the entities may be configured to communicate through any other suitable interfaces and some entities may be removed and/or added to the system depending on the configuration of the system.

In the following description, an "acquirer" is typically a business entity (e.g., a commercial bank) that has a business relationship with a particular merchant. An "issuer" is typically a business entity (e.g., a bank or credit union) which issues a payment device (such as a credit card, debit card, smart card, prepaid device or contactless device) to an account owner and which provides administrative and management functions for the payment account. Some entities may perform both issuer and acquirer functions. A payment account may be any account usable in a transaction, such as a credit, debit or prepaid account.

The term "computer" can include a system comprising a processor and a computer readable medium, such as computer memory or other data storage device, coupled to the processor. The computer readable medium stores code executable by the processor. The term "server computer" can include a computer or cluster of computers. For example, the server computer can be a mainframe, a minicomputer cluster, or a group of servers functioning as a unit. In one example, a server computer may be a database server coupled to a Web server. Data transfer and other communications between components such as computers may occur via any suitable wired or wireless network, such as the Internet or private networks.

The mobile device 110, may be a mobile communication device including a cellular or wireless telephone (e.g., a smartphone), personal digital assistant (PDA), portable computer (e.g., tablet or laptop computer), pager, or other portable device carried by the payment account holder. Additionally, the mobile device may include a portable consumer device in the form of a card that includes a contactless payment element, and that may be used to initiate a transaction, in accordance with some embodiments of the present invention. For example, the mobile device may include a "smart card" or similar device, such as a credit or debit type card in which a chip is embedded. One form of such a device is known as an EMV (Europay™, MasterCard™ and Visa™) card. In the context of the present invention, EMV refers to a standard for interoperation of IC cards ("chip cards") and IC card capable POS terminals and ATMs, and is used for authenticating credit and debit card payments. The EMV standard defines the interactions at the physical, electrical, data and application levels between IC cards and IC card processing devices for use in financial transactions.

The access device 150 may include a device that is configured to receive payment information from the mobile device and initiate a transaction. Examples of access devices 150 include point of sale (POS) devices, cellular phones, PDAs, personal computers, tablets, handheld specialized readers, set-top boxes, electronic cash registers, automated teller machines (ATMs), virtual cash registers, kiosks, security systems, access systems, and the like.

The access device 150 may use means such as a radio frequency (RF) reader to interact with the mobile device 110 through a short range communication channel (also referred to as contactless communication). For example, communications may occur between a contactless element of mobile device 110 and an access device 150, such as a merchant device reader or point of sale terminal, by using a wireless communications mechanism, such as near field communications (NFC), radio frequency (RF), infra-red (IR), optical communications, etc.

In a typical transaction, a payment device such as the mobile device 110 (also referred to as a portable communication device) interfaces with the access device 150 (which, in some embodiments, may be incorporated into merchant computer 160) to initiate a transaction. Additional information regarding the interaction between the access device and the mobile device is provided below in reference to FIGS. 2-7.

After the access device 150 communicates with the mobile device 110, the access device 150 or the merchant computer 160 in communication with the access device 150 may generate an authorization request message for the transaction. The data included in the authorization request message (also referred to as an "authorization request") may include data obtained from a mobile device 110 as well as other data related to the transaction, the payment account holder, or the merchant, such as one or more of a payment account number, the payment device expiration date, a currency code, the sale amount, a merchant transaction stamp, the acceptor city, the acceptor state/country, etc.

An authorization request message may be protected using a secure encryption method (e.g., 128-bit SSL or equivalent) in order to prevent data from being compromised. In one embodiment, the authorization request message is a standardized interchange message such as an International Organization for Standardization (ISO) 8583 message. An ISO 8583 message includes a message type indicator; one or more bitmaps indicating which data elements are present in the message, and data elements of the message. The authorization request message may comprise routing information as part of or in addition to the interchange message. As part of generating the authorization request message, merchant computer 160 may communicate with a database which stores data such as data regarding the account owner, the payment device, or the account owner's transaction history with the merchant. The merchant computer 160 (or access device 150) transmits the authorization request message to the acquirer computer 170. Acquirer computer 170 then transmits the authorization request to a payment processing network 180.

A payment processing network 180, also referred to as a "payment network," is a system that may comprise one or more servers, data processing subsystems, networks, and operations used to support and deliver authorization services, exception file services, and clearing and settlement services. A payment processing network may be able to process one or more of credit card transactions, debit card transactions or any other type of commercial transaction. An exemplary payment processing network may include, for example, VisaNet™. Although the system of FIG. 1 only shows one payment processing network, any number of payment processing networks may be implemented in the transaction eco-system to allow the merchant computer 160 to determine the payment processing network 180 that they support and select the appropriate payment application associated with the one or more payment processing networks.

The payment processing network 180 transmits the authorization request message to an issuer computer 190. The issuer computer 190 generates an authorization response message indicating whether the transaction was authorized. The authorization response message is routed back to the merchant computer 160. The authorization response may be displayed by the access device 150 (e.g., a POS terminal), transferred to the mobile device 110, printed on a receipt, or otherwise conveyed to the payment account holder.

At the end of the day, a normal clearing and settlement process can be conducted by each of the payment processing network. A clearing process is a process of exchanging financial details between an acquirer and an issuer to facilitate posting to the payment account holder's account and reconciliation of the consumer's settlement position. Clearing and settlement can occur simultaneously.

Figure 2:
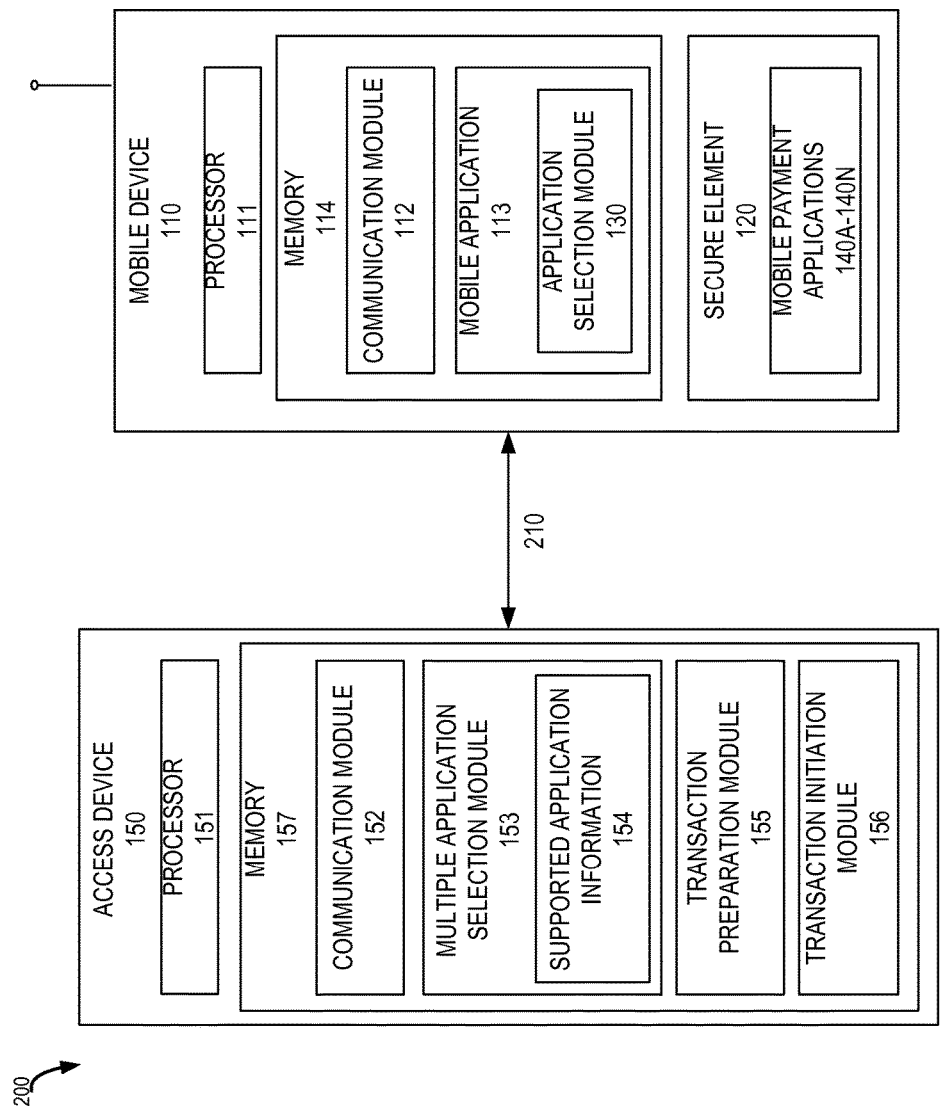
FIG. 2 shows a block diagram of a portion of the system for conducting a transaction between a mobile device and an access device including a communication interaction between the mobile device and the access device, according to one embodiment of the invention.

FIG. 2 shows more detailed block diagrams the mobile device 110 and the access device 150. The mobile device 110 and the access device 150 may communicate in order to pass payment information for initiating and processing a transaction. FIG. 2 shows two of the devices in a system for processing payment transactions initiated by a mobile device 110 communicating with an access device 150.

The mobile device 110 may include a processor 111, a memory 114 including a communication module 112 and a mobile application 113, and a secure element 120. The mobile application 113 may include an application selection module 130. The secure element 120 may include mobile payment applications 140A-140N including provisioned payment information associated with consumer account information and/or payment credentials.

The number of mobile payment applications 140A-140N may depend on the number of provisioned accounts and/or configuration options of the secure element 120. For instance, some accounts may provision multiple mobile payment applications for the same account information (e.g., a separate payment application with a different AID may be provisioned on the secure element for the same underlying account information). For instance, this may be the case where a debit account is provisioned on a mobile device. Two different payment applications may be provisioned in response to a request to provision the debit account on the device. The mobile device may have two separate payment applications provisioned on the mobile device for the same underlying account information. One of the payment applications may be used for payment credentials associated with a common debit AID implementation of the debit account while the other payment application may be used for a network-specific debit AID implementation for the second payment application.

The communication module 112 of the mobile device 110 may include any code, application, or any other software module configured to interface with an antenna or other communications hardware of the mobile device 110 to communicate with an access device 150. In some embodiments, the antenna may be configured for sending and receiving information using proximity, contactless, or other short-range communication protocols. Any other suitable communication networks, protocols, and hardware may be used. Additional information regarding the hardware (e.g., antenna, display, etc.) of the mobile device 110 may be found in FIG. 9 below.

The mobile application 113 may include any application, code, or other software module configured to interface with one or more of the mobile payment applications 140A-140N. The mobile application 113 may allow a consumer to interface with the mobile payment applications 140A-140N to perform a transaction, add account information to one or more of the mobile payment applications 140A-140N, set priorities for the various payment information and/or payment applications on the device, determine a default payment application, and/or provide any other functionality for managing and/or configuring one or more of the mobile payment applications 140A-140N. The mobile application 113 may interface with the communication module 112 and subsequently a contactless element to interface with an access device 150 and exchange information with the access device 150 to initiate a transaction.

Further, there may be more than one mobile application 113 where each mobile application 113 may be configured to interface with a particular payment application or group of payment applications. For example, a mobile wallet provider, account issuer, payment processing network, merchant, etc. may develop their own mobile applications in which to interact with the mobile payment applications 140A-140N on the mobile devices.

The application selection module 130 may include any sub-application, code, or software module installed on the mobile device 110 that is capable of performing the methods and functionality described herein. The application selection module 130 may be implemented as part of a mobile application 113 (as shown) or may be an independent application configured to interface with a mobile application 113. The application selection module 130 and the processor 111 may be configured to manage, identify, and communicate a list of AIDs associated with provisioned or installed payment applications on a secure element 120 (or other memory of the mobile communication device 110) as well as the corresponding priorities for the AIDs. The application selection module 130 may be configured to interact with mobile payment applications 140A-140N on the secure element 120. In some embodiments, the application selection module 130 may interact with the mobile application 113 and the application selection module may be implemented in the secure element 120.

The mobile payment applications 140A-140N may include software modules installed or provisioned on the secure element 120 that are capable of providing payment information stored on the secure element 120 during a transaction. The mobile payment applications 140A-140N may be provisioned on the secure element 120 by any entities within a mobile communication ecosystem (e.g., mobile network operator, device manufacturer, payment processing network, etc.). Further, issuer updates and other maintenance information may be sent to the mobile communication device from the payment processing network (as shown in FIG. 1) or through any other suitable entity to update the payment account information (e.g., payment credentials), issuer information, application lifecycle information, or any other suitable information that allows the mobile payment applications 140A-140N to initiate transactions through the transaction processing system. The mobile payment applications 140A-140N may be associated with one or more application identifiers (AIDs) that identify payment information associated with one or more accounts provisioned on the mobile payment application 140.

The access device 150 may communicate 210 with the mobile device 110 to obtain application information (e.g., AID, account information, payment credentials, cardholder verification results, etc.) from the one or more mobile payment applications. The access device 150 may include a processor 151 and a memory 156 including a communication module 152, a multiple application selection module 153, a transaction preparation module 155, and a transaction initiation module 156. The modules may be contained on a computer-readable memory 157 coupled to the processor 151 where the computer-readable memory (or medium) 157 comprises code, executable by the processor, for performing the functionality described herein.

The communication module 152 of the access device 150 may include any code, application, or any other software module configured to interface with an antenna or other communications hardware of the access device 150 to communicate with a mobile device 110. In some embodiments, the antenna may be configured for proximity, contactless, or other short-range or long-range communication protocols. The communication module 152 and the processor 151 may be configured to identify the presence of a mobile device 110 when it is within the communication range of the access device 150. The communication module 152 and the processor 151 may be configured to send and receive a number of different communications and messages with a mobile device 110.

The multiple application selection module 153 may include any application, code, and/or any other software configured to select a supported application on a mobile device 110 in which to initiate a transaction. For example, the multiple application selection module 153 and the processor 151 may be configured to obtain the list of available payment applications from the communication module 152, determine supported AIDs from the list of available AIDs, and obtain payment credentials associated with the selected AIDs.

The transaction preparation module 155 may include any application, code, and/or any other software configured to prepare the received payment credentials for transaction processing. For example, the transaction preparation module 155 may prepare a transaction payload for each selected AID corresponding to a payment application on a mobile device.

The transaction initiation module 156 may include any application, code, and/or any other software configured to initiate payment transaction processing. For example, the transaction initiation module 156 may be configured to authenticate the consumer based on the cardholder verification method (e.g., PIN, signature, cardholder device passcode, etc.) associated with the selected application, check restrictions associated with the transaction data (e.g., transaction limit, geographical limitations, etc.), obtain consumer authorization/approval, provide processing options to the consumer (e.g., indicate available transaction options to consumer), and perform any other validation and/or processing actions. The transaction initiation module 156 may also perform any steps in order to process the transaction using the transaction payload. For example, the transaction initiation module 156 may generate and/or send an authorization request message for the transaction or may pass the transaction payload to a merchant computer 160 for generation of an authorization request message for payment network processing.

The communications 201 between the mobile device 110 and the access device 150 may occur over a short range communication channel which includes any suitable communication standard and/or protocol that the mobile device 110 and the access device 150 share. For example, the communication may occur between near-field communication (NFC) components (e.g., antennas) that are configured to allow the transmission and reception of communication packets between the mobile device 110 and the access device 150.

Figure 3:
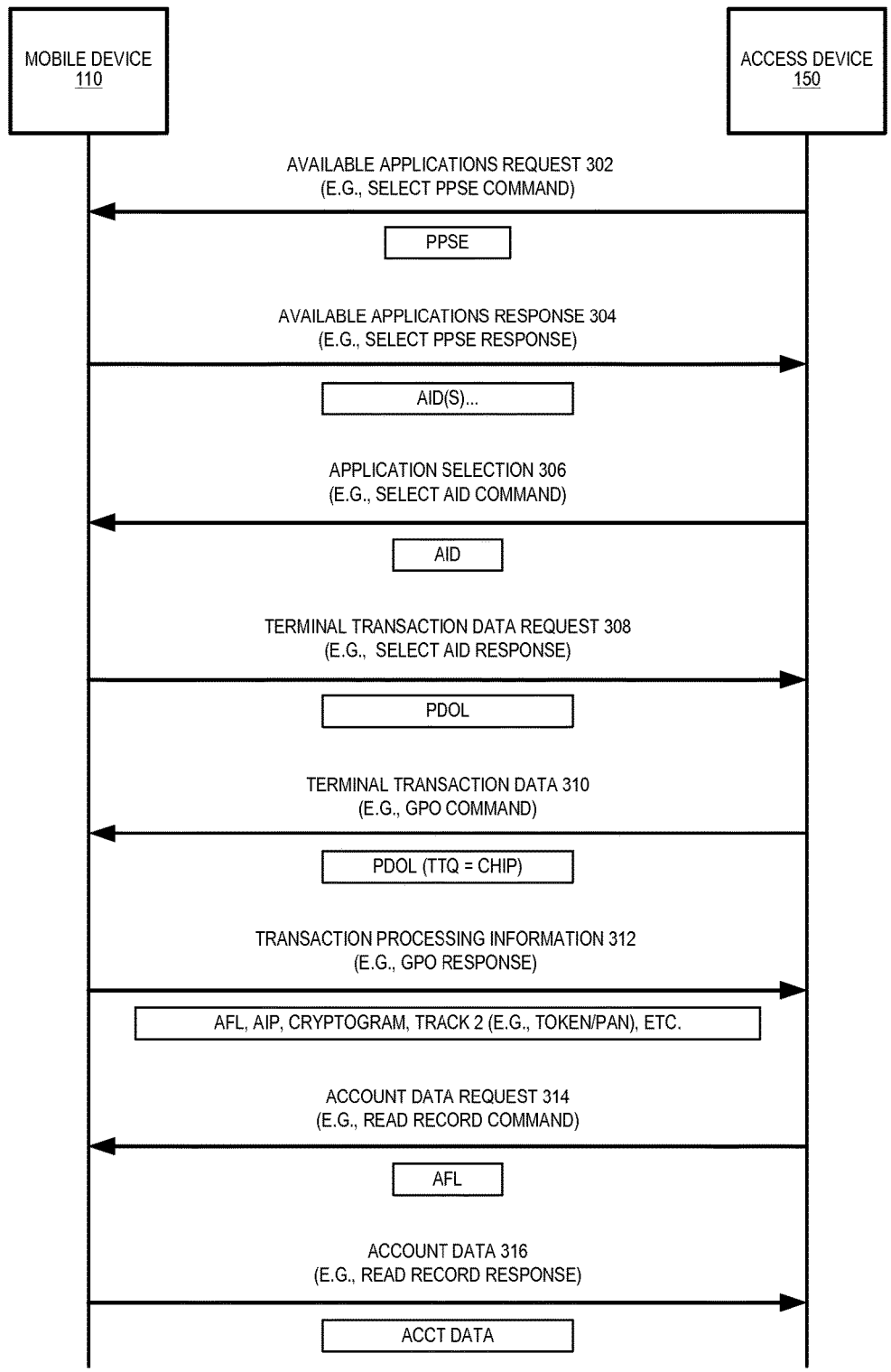
FIG. 3 shows an exemplary flow diagram of a data communication between a mobile device and an access device during a payment transaction, according to one embodiment of the invention.

II. Exemplary Communication Protocol Between a Mobile Device and an Access Device During a Payment Transaction FIG. 3 shows an exemplary flow diagram of a short range communication 201 between a mobile device and an access device during a payment transaction, according to one embodiment of the invention. Note that FIG. 3 shows one exemplary implementation of the concepts described herein and embodiments are not limited to such communication protocols, methods, and steps. Accordingly, although FIG. 3 shows one implementation for of communicating payment information between an access device and a mobile device, many other protocols and communication techniques could be implemented.

The communication module 112 and the processor 111 of the mobile device 110 may be configured to identify the presence of an access device 150 within communication range. For example, the communication module 112 may ping or otherwise attempt to find suitable devices to communicate with periodically. When the access device 150 detects the presence of mobile device 110 in proximity to a contactless reader of the access device 150, the multiple application selection module 153 of the access device 150 may initiate a transaction by sending an available applications request 302 to the mobile device 110 to request information on which payment applications (e.g., a list of AIDs) may be available on the mobile device 110. In some embodiments, the available applications request 302 may be in the form of a "select proximity payment system environment (PPSE)" command. In such embodiments, the available applications request 302 may include a payment environment identifier (e.g., a PPSE name such as "2PAY.SYS.DDF01") to identify the payment environment supported by access device 150.

Upon receiving the available applications request 302, the application selection module 130 of the mobile device 110 may identify and process the request by recognizing the payment environment identifier (e.g., PPSE name) included in the request, and respond by sending an available applications response 304 back to access device 150. The available applications response 304 may include a list of available AIDs, application configuration options associated with available AIDs, and may include the payment environment identifier (e.g., PPSE name) as the dedicated file name.

In some embodiments, the available applications response 304 may be in the form of a "select PPSE" response and may include PPSE file control information (FCI). For example, the available applications response 304 may include a directory entry for each available AID on the mobile device 110. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available applications response 304 may also include other data such as FCI issuer discretionary data.

The access device 150 may determine a supported application and may send an "application selection" command 306 with the selected AID to the application selection module 130 of the mobile device 110.

Additionally, in some embodiments, upon receiving the application selection message 306, the application selection module 130 of the mobile device 110 may send a terminal transaction data request 308 to request transaction data from access device 150 which may be needed to execute the transaction using the selected application associated with the selected AID. In some embodiments, the terminal transaction data request 308 may be in the form of a select AID response and may include AID file control information (FCI) with the selected AID as the dedicated file name. The terminal transaction data request may include a list of transaction data identifiers to request the appropriate data from access device 150, and the list of transaction data identifiers can be in the form of a processing options data object list (PDOL). The transaction data requested by the mobile application 113 for the transaction may include terminal transaction qualifiers (TTQ), authorized amount, other amount, terminal country code, terminal verification results, transaction currency code, transaction data, transaction type, and/or an unpredictable number. The terminal transaction data request may also include other data such as FCI issuer discretionary data, application program identifier, and language preference. In other embodiments, the transaction information may be provided as part of the application selection message and/or as part of the available application request message.

After receiving the terminal transaction data request 308, access device 150 may send, to the mobile application 113 of mobile device 110, the terminal transaction data 310 requested by the mobile application 113. In some embodiments, the terminal transaction data 310 may be sent in the form of a get processing options (GPO) command, and may include the requested terminal transaction data 310 in a processing options data object list (PDOL). In some embodiments, the terminal transaction data 310 (e.g., terminal transaction qualifiers (TTQ)) may include a transaction type indicator indicating which transaction data types the access device 150 supports. In some embodiments, the terminal transaction data 310 (e.g., terminal transaction qualifiers (TTQ)) may also include a consumer verification method (CVM) requirement indicator to indicate whether a CVM is required by access device 150 for the transaction, and also one or more CVM type indicators indicating the types of CVM supported by access device 150. Examples of CVMs that may be supported by access device 150 can include online PIN, signature, and/or consumer device CVM (CDCVM) such as a passcode used on mobile device 110 to unlock the screen or mobile application 113.

Once the application selection module 130 of the mobile device 110 receives terminal transaction data 310, the application selection module 130 may send a set of transaction processing information 312 including the payment credentials and any other relevant transaction processing information to the access device 150. In some embodiments, the transaction processing information 312 can be sent in the form of a "get processing options" (GPO) response. In some embodiments, the transaction processing information may include one or more application file locators (AFLs) that can be used as file addresses by access device 150 to read account data stored on the mobile device 110, and an application interchange profile (AIP) that can be used to indicate the capabilities of the mobile payment application.

For example, the transaction processing information may include a transaction cryptogram generated using transaction information, track-2 equivalent data, and additional data such as issuer application data (IAD), a form factor indicator (FFI), card transaction qualifiers (CTQ), cryptogram information data (CID), an application transaction counter (ATC), and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer), card verification results (CVR), and/or a wallet provider identifier.

The card verification results (CVR) may include information about the CVM verifying entity and the CVM verified type for the transaction. The CVM verifying entity is used to indicate which entity is performing the verification of the CVM for the transaction. The verification entity may be the access device 150 (or terminal), a co-residing secure application, a trusted execution environment application, the mobile application 113 itself, a remote server (e.g., the cloud), or the mobile operating system. The CVM verified type is used to indicate the CVM method used for the transaction. The CVM method may be a passcode, biometric (e.g., fingerprint), pattern lock (e.g., for a screen lock), signature, or online PIN. In some embodiments, if the terminal transaction data 310 received from access device 150 indicates that the CVM supported by access device 150 is an online PIN or a signature, the CVM verifying entity in the CVR can be set to the access device 150 (or terminal) to indicate that access device 150 is the verifying entity, and the CVM verified type can be set accordingly (e.g., online PIN or signature).

If the terminal transaction data 310 received from access device 150 indicates that the CVM supported by access device 150 is a CDCVM, the CVM verifying entity and the CVM verified type can be set according to the configuration parameters of the account. For example, if the account supports CVM using a passcode that is verified by the mobile operating system of mobile device 110, the CVM verifying entity can be set to the mobile operating system, and the CVM verified type can be set to indicate that the CVM is a passcode. In some embodiments, a CDCVM performed indicator can be included in the card transaction qualifiers (CTQ) to indicate whether the CVM verifying entity has successfully verified the user using the CDCVM indicated by the CVM verified type.

If the terminal transaction data 310 received from access device 150 indicates that a CVM is not required, the CVM verifying entity and the CVM verified type can be set to indicate that no CVM was verified.

The form factor indicator (FFI) may include information about mobile device 110, such as a form factor indicator version number indicating the version of the form factor indicator being used, a consumer payment device form factor indicator indicating the device type of mobile device 110, and consumer payment device features indicators indicating what payment features are supported by mobile device 110. The consumer payment device form factor may indicate that mobile device 110 is a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether mobile device 110 is capable of using a passcode (can be separate from a PIN that is used during transactions), has a signature panel, has a hologram, has support for card verification values (e.g., CVV2), is capable of two-way messaging to exchange identifying information between the issuer and the user, and/or any other relevant information. The form factor indicator (FFI) may also include a payment transaction technology indicator indicating that mobile device 110 supports contactless transactions (e.g., NFC).

It should be understood that in some embodiments, the transaction processing information 312 being sent from mobile device 110 to access device 150 may include some or all of the information describe above, and in some embodiments, may include additional information not specifically described.

After the access device 150 receives the transaction processing information 312, the access device 150 may send an account data request 314 to the application selection module 130 of mobile device 110 to read additional account data 316 that may be stored on the mobile device 110. In some embodiments, the account data request 314 may be in the form of a "read record" command, and may include an application file locator (AFL) indicating the location of the account data that access device 150 is attempting to read. The AFL included in the account data request 314 may correspond to an AFL in the transaction processing information 312 that was provided to access device 150 from mobile device 110.

In response to receiving the account data request 314 from the access device 150, the mobile device 110 may send the account data 316 stored at the location indicated by the AFL to access device 150. In some embodiments, the account data 316 may be sent in the form of a "read record" response. The account data 316 may include, for example, application usage control that indicates the issuer's restrictions on the usage and services allowed for the application, the cardholder's name, customer exclusive data, issuer country code, and/or other account related data that is accessible at the AFL location and is stored in the mobile device 110.

It should be understood that in some embodiments, the account data 316 being sent from mobile device 110 to access device 150 may include some or all of the information describe above, and in some embodiments, may include additional information not specifically described. Further, any and all of this information may be provided in response to receiving a selection message and/or obtaining payment credentials as will be described in further detail below.

Figure 4:
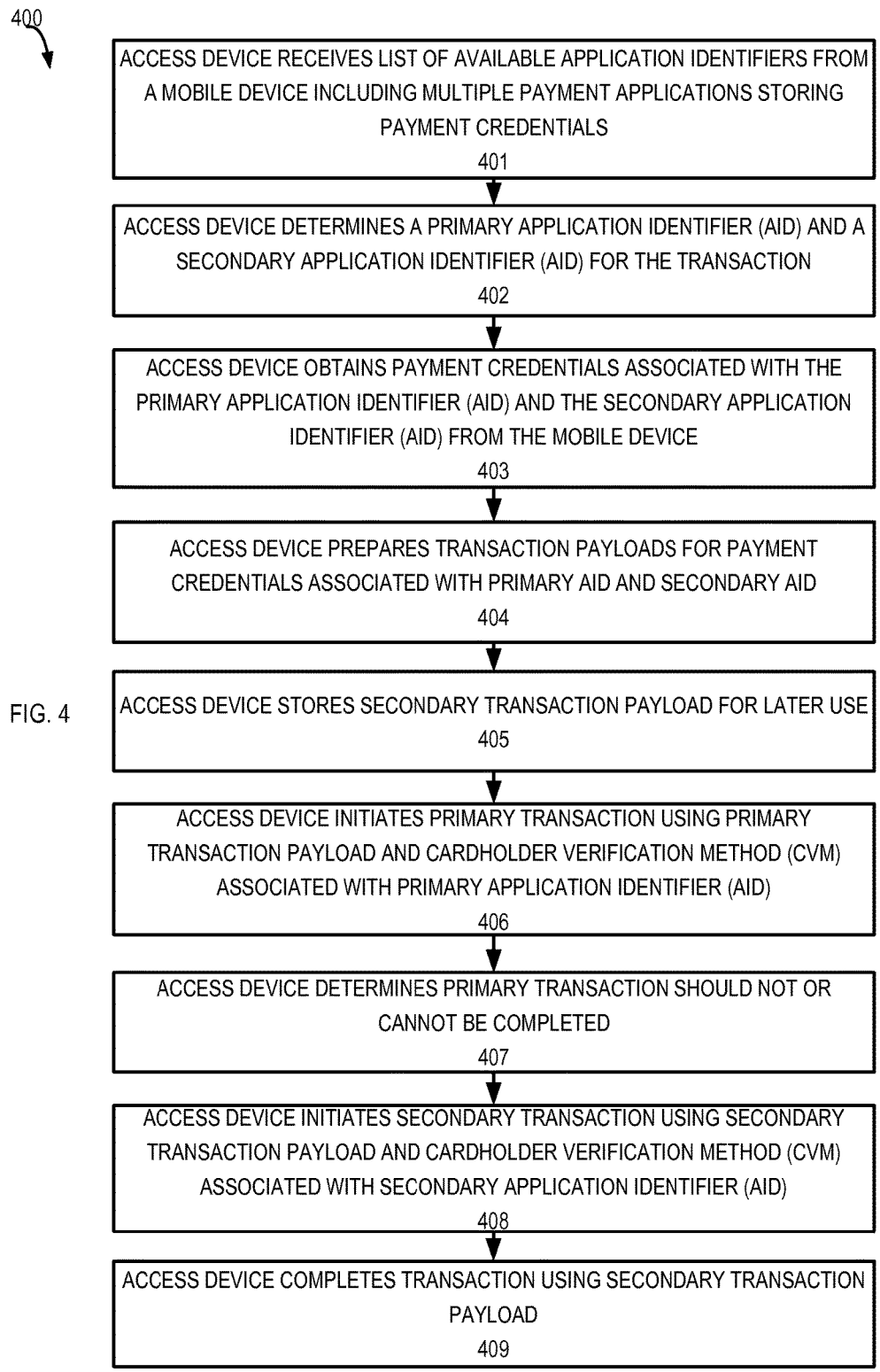
FIG. 4 shows a flow diagram of an exemplary method of performing a payment transaction using multiple application identifiers, according to an embodiment of the invention.

III. Exemplary Methods of Conducting Transactions Using Multiple Application Identifiers FIG. 4 shows an exemplary method of processing a transaction initiated by a mobile device 110 communicating with an access device 150, according to some embodiments. In some embodiments, the communications can be in the form of application protocol data unit (APDU) commands and responses. However, it should be understood that other messages, messaging protocols, or message formats can be used to exchange the relevant information to conduct the transaction. Thus, although particular commands and responses are provided as examples in the discussion below, it should be understood that embodiments are not limited to such commands and responses.

At step 401, an access device 150 receives a list of available AIDs from the mobile device 110 for a transaction. The list of available AIDs may be requested by the access device 150 or the mobile device 110 may provide the list of AIDs without a corresponding request. For example, an application selection module 130 and the processor 111 of the mobile device 110 may determine AIDs associated with mobile payment applications 140A-140N provisioned on the mobile device 110 that are configured to be used by the mobile application 113 and provide a list of available payment applications to an access device 150.

In some embodiments, the application selection module 130 may provide AIDs for only those applications that are available for performing a transaction through the mobile application 113. As such, in some embodiments, the application selection module 130 may determine the status and configuration information for the mobile payment applications 140A-140N before including the associated AID as an available AID. For example, if a mobile payment application is not available to the mobile application 113, if the account associated with the mobile payment application is not in good standing with an issuer (e.g., delinquent), a mobile payment application may not qualify as a payment application to use for a transaction or the priority of the mobile payment application may be altered (e.g., a consumer may set a limit of a predetermined number of payment applications to be presented to the access device 150), the transaction information may not qualify for a mobile payment application 140 (e.g., geographic location indicates that a domestic payment account should be used as opposed to an international payment account), or for any other suitable reason a mobile payment application may not be active and ready for use in a transaction.

Accordingly, in some embodiments, the application selection module 130 may maintain and analyze mobile payment application information including, for example, a current status (e.g., active vs. inactive), transaction restrictions (maximum transaction count, transaction value, etc.), account restrictions or rules (e.g., geographic restrictions, etc.), or any other suitable information for determining available mobile payment applications 140A-140N for a transaction along with the AID.

Accordingly, the application selection module 130 may provide a list of available AIDs along with priority information to an access device 150. The list of available payment applications may include AIDs which identify a type of payment application, a payment network associated with a payment application, a type of payment information stored within a payment application, account features (e.g., type of account, account features, etc.), and any other relevant information associated with a payment application and/or account information provisioned or otherwise associated with the payment application.

The access device 150 may only be configured to receive and process particular types of information associated with particular payment applications. For example, if the access device 150 is only configured to process transactions using a certain payment processing network (e.g., VisaNet™), the access device 150 may not process transaction information originating from payment applications that are only configured to provide information in the format for processing with a different payment processing network (e.g., MasterCard™). Accordingly, the access device 150 and mobile device 110 may perform a payment application identification and selection process before a transaction may be initiated.

At step 402, the multiple application selection module 153 of the access device 150 determines two or more AIDs for use in processing the transaction. For example, the access device 150 may determine a first AID and a second AID from the list of AIDs received from the mobile device 110. The access device 150 may be configured to initiate a transaction using the two or more AIDs and the access device 150 may determine the two or more AIDs through any suitable method. For example, a pre-selection process may be performed where the access device 150 determines the first and second highest priority AID based on the processing capabilities, configuration options, and processing capabilities associated with each AID.

For instance, some AIDs and corresponding payment information may be configured to only be processed on a particular network (e.g., network-specific AID) while other mobile payment applications 140A-140N and corresponding payment information may be configured to be processed through other payment networks or a variety of payment networks (e.g., network-generic AID). Additionally, different applications may have different cardholder verification methods (CVMs) that provide a higher or lower level of verification of a consumer's identity (e.g., PIN validation vs. Signature).

The selection or determination process may include any number of steps and may use supported application information 154 stored in the access device 150 to determine two or more AIDs for a transaction. For example, the application selection process may include determining which of the AIDs from the list of AIDs are supported by the access device 150. Access devices may be configured to process certain applications and their corresponding payment credentials. Alternatively and/or additionally, other information may be used to determine applications that are supported by the access device 150. Such information may include application configuration information or any other information that may be provided with the list of AIDs.

For example, the access device 150 may receive an available application response including four different AIDs (AID 1-4) and configuration information associated with four different mobile payment applications (MPA 1-4). The multiple application selection module 153 may then determine which of the four AIDs are supported by the access device 150. Thus, the multiple application selection module 153 may compare the received available AIDs to a list of supported AIDs stored in the access device 150. If the AIDs cannot be found in the supported AIDs information, the AIDs may be discarded from further consideration. For instance, if AIDs 2 and 3 are associated with a payment network that the access device 150 is not configured to process, they may be removed. Accordingly, after removing unsupported AIDs, the received AIDs may only include those applications that the access device 150 is configured to process (e.g., AID 1 and 4).

The access device 150 may support multiple AIDs from the list of available payment applications. Thus, the multiple application selection module 153 of the access device 150 may use priority information and/or preferences stored in the supported application information 154 to determine the priority of the supported applications for use in the transaction. Accordingly, the access device 150 may determine a primary AID (or "preferred AID") and a secondary AID (or "alternate AID") from at least two payment AIDs included in the list of available payment applications according to preferences stored by the access device 150.

The preferences may be determined using any suitable method and using any suitable information including authentication and configuration options of the payment applications (e.g., type of authentication and/or level of authentication performed by the application), geographical restrictions associated with the access device 150 (e.g., international vs. domestic transaction for the payment application), based on transaction specific information (e.g., a transaction amount threshold or limit, time limit, etc.), or based on any other suitable information associated with the account, consumer, merchant, mobile device 110, transaction information, or any information available. Accordingly, the priority ranking of each payment application may be based on the preferences of the access device 150, the mobile application 113 and/or mobile device 110, relationship information between particular selected AIDs, configuration options of the applications (e.g., CVMs associated with the AID, restrictions associated with the AIDs, etc.), or any other information available to the access device 150.

For example, AID 1 may identify a mobile payment application storing provisioned debit card payment information which requires an online PIN as a cardholder verification method (CVM), which is listed as the third priority application by the consumer, and which the supported application information 154 indicates is supported and is the third ranked AID for transaction processing. AID 4 may identify a mobile payment application storing provisioned credit card payment information which requires a signature CVM method, is listed as the first priority application by the consumer, and which the supported application information 154 indicates that the AID is supported and is the 13th highest ranked AID for transaction processing. The access device 150 may select either AID 1 or AID 4 as the highest priority AID depending on the various embodiments that may be implemented. For instance, the access device 150 may determine that AID 1 is the highest priority AID because it is the highest ranked AID as far as the access device 150 is concerned. However, if the access device 150 considers the consumer's ranking, AID 4 may be selected. Further, for transaction security, AID 1 may be selected as the highest priority AID because it requires an online PIN to process the transaction and thus has a higher level of security.

Furthermore, in some embodiments, the relationship between various AIDs may indicate the priority of the selected AIDs. For example, if AID 1 were associated with a network-generic common debit account and AID 4 were associated with a network-specific debit account implementation of the same account and AID 1 were selected as a preferred AID, AID 4 may be given higher priority over another supported AID based on the relationship between AID 1 and AID 4.

However the determination and selection process is prioritized, the multiple application selection module 153 of the access device 150 may select a first priority AID as the first AID and a second priority AID as the second AID. In some embodiments, additional AIDs may be selected as well (e.g., third priority, fourth priority, etc.).

At step 403, the multiple application selection module 153 may obtain payment credentials associated with the primary AID and the secondary AID stored on the mobile device 110. Any suitable methods may be implemented for obtaining the payment credentials and any other transaction processing information may also be obtained. For example, obtaining the payment credentials may include sending one or more of the selected AIDs to the mobile device 110 and receiving the payment credentials and transaction processing information associated with the mobile payment application identified by the AID from the mobile device 110. In some embodiments, separate selection messages may be sent for each determined AID. Thus, the selection process may be repeated for a secondary selected AID and/or any other number of times for each of the selected AIDs. Alternatively, a single selection message may be sent that includes all of the determined AIDs.

For example, in some embodiments, obtaining payment credentials may include performing the steps and protocols described above in reference to FIG. 3. Accordingly, the access device 150 may obtain more than merely the payment credentials and may obtain any of the transaction processing information 312 described above in reference to FIG. 3.

Alternatively and/or additionally, any other processes may be completed in order to obtain the payment credentials associated with the AIDs. Accordingly, any number of requests, commands, or any other communications may be sent between the access device 150 and the mobile device 110 in order to obtain payment credentials associated with one AID selected by the multiple application selection module 153. Further, the above series of messages and/or commands may be repeated by the multiple application selection module 153 in order to obtain payment credentials associated with the secondary AID. As such, the processing and information described in messages 306-312 of FIG. 3 may be repeated for multiple selected AIDs instead of a single AID as described in reference to FIG. 3.

Alternatively and/or additionally, some embodiments may be configured to obtain the payment credentials associated with the multiple selected AIDs in a single set of requests to the mobile device 110. For example, the multiple application selection module 153 of the access device 150 may include an indicator of the number of AIDs being selected and the AIDs in which to obtain the payment credentials in the "select AID" command described above. As such, the application selection module 130 of the mobile device 110 may perform some or all of the processes and requests/responses described in the steps above in order to process multiple selection requests by the multiple application selection module 153 of the access device 150.

At step 404, the transaction preparation module 155 of the access device 150 prepares a first transaction payload including first payment credentials associated with the first AID and a second transaction payload including second payment credentials associated with the second AID. After the multiple application selection module 153 receives the payment credentials and transaction processing information from the mobile device 110 for one or more of the AIDs, the transaction preparation module 155 may prepare the payment credentials and the access device 150 for processing of the transaction using the payment credentials by preparing a transaction payload for the received payment credentials.

The transaction preparation module 155 of the access device 150 may prepare the transaction payload for the payment credentials received for each of the applications associated with the multiple selected applications identifiers as the payment credentials are received or once the number of transactions are determined and the communication of the payment credentials for each of the payment applications is completed. For instance, the transaction preparation module 155 may use the transaction processing information received for each of the applications and determine the appropriate CVM for the transaction, whether any restrictions apply for the transaction, etc., and may generate a transaction payload using the payment credentials for each of the multiple payment applications. For instance, the transaction preparation module 155 may re-format the received payment credentials to conform to a predetermined communication protocol (e.g., ISO message format) for delivery to a payment processing network.

At step 405, the transaction preparation module 155 of the access device 150 stores the prepared transaction payloads and associated transaction processing information in a temporary memory. The transaction preparation module 155 of the access device 150 may store each of the transaction payloads by priority in a temporary memory such that the information associated with each transaction is ready to be initiated for any of the transaction payloads. For example, the CVM and/or CVR associated with each of the received payment credentials may be stored as part of the transaction payload or may be stored along with the transaction payload such that the transaction initiation module 156 of the access device 150 may obtain all of the relevant information for the transaction payload as soon as it is needed.

In some embodiments, all of the transaction payloads may be stored in the memory while in other embodiments, only those transaction payloads that are not associated with the highest priority AID are stored in the memory. As such, in some embodiments, if two AIDs were selected and two different transaction payloads are prepared for a transaction, only the second transaction payload may be stored in the memory as the transaction initiation module 156 of the access device 150 is initiating a transaction using the transaction payload for the highest priority AID.

At step 406, the transaction initiation module 156 of the access device 150 initiates a first transaction using the first transaction payload. The transaction initiation module 156 may perform any steps associated with preparing an access device 150 to initiate a transaction and ensuring a transaction should be processed. For example, the transaction initiation module 156 may be configured to authenticate the consumer based on the cardholder verification method associated with the selected application (e.g., PIN, signature, cardholder device passcode, etc.), check restrictions associated with the transaction data (e.g., transaction limit, geographical limitations, etc.), obtain consumer authorization/approval, provide processing options to the consumer (e.g., indicate available transaction options to consumer), and perform any other validation and/or processing actions.

At step 407, the transaction initiation module 156 of the access device 150 determines that the first transaction should not or cannot be completed. The transaction initiation module 156 may use any suitable information and any suitable process for determining that the transaction should not or cannot be completed.

For example, the transaction initiation module 156 may determine that the transaction should not or cannot be completed based on information received from the consumer. For instance, the transaction initiation module 156 may determine that a cardholder verification method input is not received by the access device 150 in a predetermined period of time. Alternatively and/or additionally, the transaction initiation module 156 may determine that the received cardholder verification method input from the consumer is not correct but the transaction is of such a low level of risk or other aspects of the transaction inform the access device 150 that the transaction should continue with an application that has a cardholder verification method that allows for a lower level of authentication of the consumer (e.g., signature). Alternatively and/or additionally, the access device 150 may receive an input from a consumer indicating a preference for initiating another transaction using a different account, card, and/or payment application.

Additionally, in some embodiments, the transaction initiation module 156 may determine that the selected mobile payment application and/or the payment credentials associated with the selected mobile payment application are not compatible for the transaction. For example, the payment network may be down or out of order during transaction processing. As another example, the transaction amount may be so large that a particular type of CVM is required that the application is not compatible with. Any other suitable methods may be implemented to determine that the transaction cannot or should not be completed.

At step 408, the transaction initiation module 156 of the access device 150 may initiate a second transaction using the stored second transaction payload from the temporary memory. The transaction initiation module 156 of the access device 150 may determine the next highest priority transaction payload that is stored in the memory for the transaction, may obtain the transaction payload from the memory, and may initiate the transaction using similar steps as those described above in reference to step 406. For example, the transaction initiation module 156 may determine the CVM associated with the second mobile payment application, obtain the requisite cardholder verification method input from the consumer, verify the accuracy of the CVM input, and may generate an authorization request message and/or pass the transaction payload to a merchant computer 160 for generation of the authorization request message.

At step 409, the transaction initiation module 156 of the access device 150 completes the processing of the transaction using the secondary transaction payload. For example, the transaction ignition module may send an authorization request message including the second transaction payload to an associated merchant computer 160, acquirer computer 170, and/or payment processing network for processing. Additional details regarding the remaining transaction flow and processing of the transaction is provided below in reference to the method shown in FIG. 5.

A. Exemplary Multiple Application Selection Process

Figure 5:
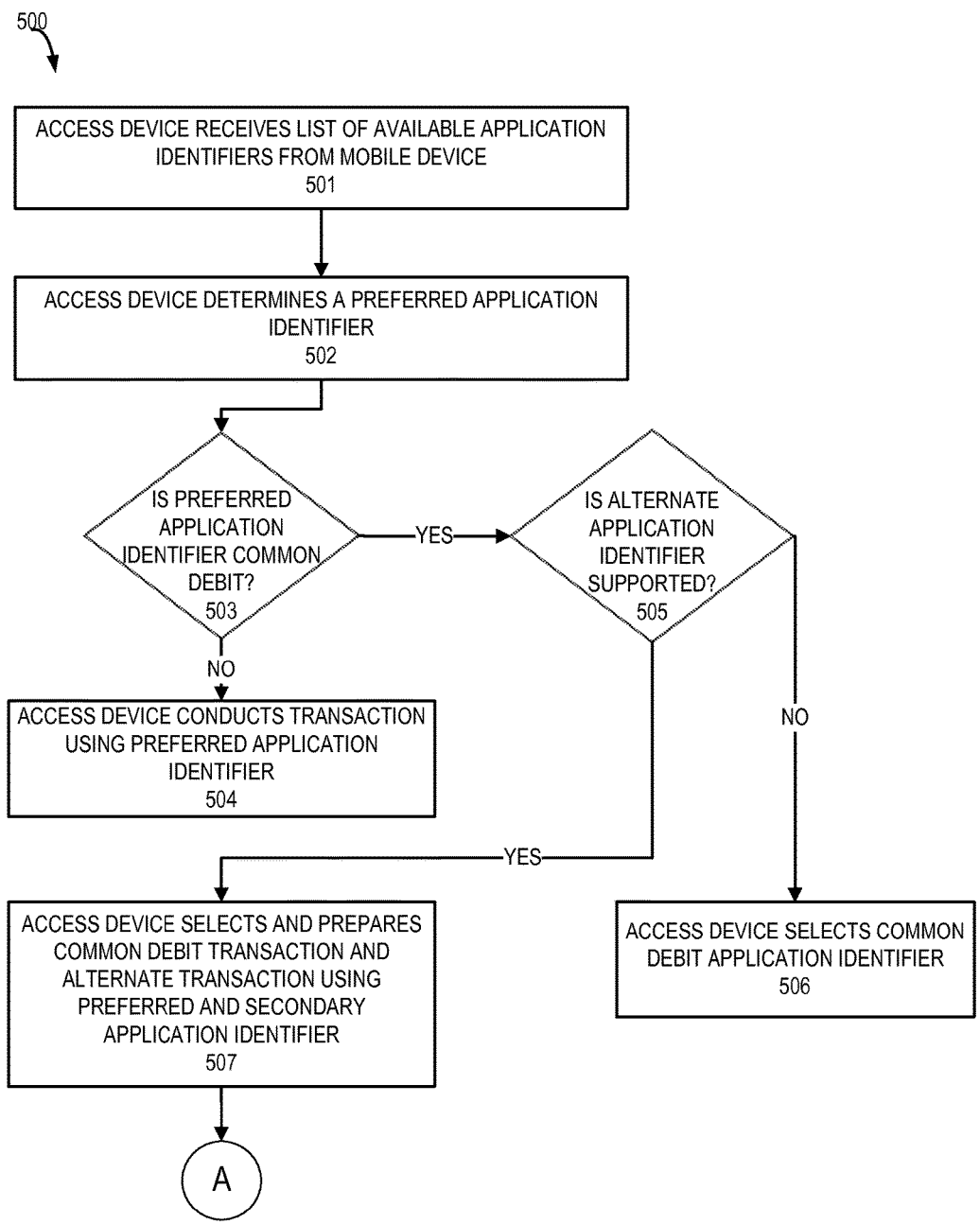
FIG. 5 shows a flow diagram of an exemplary method of conducting a transaction using multiple application identifiers where one of the application identifiers is associated with a common debit application identifier.

FIG. 5 shows one example of an embodiment of the multiple application selection process performed by an access device 150 during payment transaction processing using a payment application that is associated with a common debit AID, according to an embodiment of the invention.

At step 501, the access device 150 receives list of available AIDs from the mobile device 110. The list of available AIDs may include one or more AIDs (AIDs) associated with one or more payment applications provisioned or installed on the mobile device 110. This process is similar to step 301 described above.

At step 502, the access device 150 determines a preferred AID using the received list. The preferred AID may be determined in any suitable manner. In some embodiments, the preferred AID may be the highest priority AID as specified by the consumer or the mobile device 110. In other embodiments, the preferred AID may be the highest priority AID as specified by the merchant or the access device 150.

In yet other embodiments, the preferred AID may be determined using both the mobile device 110 and the access device 150. For example, the preferred AID may be determined using a pre-selection method. Pre-selection methods that may be used in some embodiments of the invention are described in U.S. patent application Ser. No. 13/947,984, titled "PAYMENT SYSTEM PRE-SELECTION ENVIRONMENT PROCESSING," filed Jul. 22, 2013, which is hereby incorporated by reference in its entirety for all purposes.

At decision step 503, the access device 150 determines whether the preferred AID is a common debit AID. A "common debit AID" may include any AID used to indicate that payment credentials associated with the identified application may be processed using multiple payment networks or a particular group of payment networks. Thus, the common debit AID may indicate to the access device 150 that a transaction initiated using the payment credentials received from an application associated with the common debit AID may be routed through any suitable payment processing network (rather than any specific network). The common debit AID is one example of a network-generic AID and such embodiments are not limited to payment applications with debit account information provisioned for the payment application.

At step 504, if the preferred AID is not a common debit AID, the multiple application selection module 153 of the access device 150 determines that multiple AIDs are not necessary for the transaction and the access device 150 conducts a transaction using the preferred AID. Note that the single factor determination is for purposes of an example only and are not limited to such a determination. For example, in other embodiments, multiple other criteria may be analyzed to determine whether additional factors exist that may indicate that multiple application should be selected by the access device 150. For example, any of the factors and/or criteria discussed in step 402 of FIG. 4 above could further be analyzed to determine if another application should be selected using a different AID from the list of available AIDs.

At step 505, if the preferred AID is a common debit AID, the multiple application selection module 153 of the access device 150 determines whether an alternate AID is supported. Typically, an alternate or secondary AID may include any AID other than the common debit AID that is supported by the payment application. The alternate AID may be, for example, an AID associated with a specific payment processing network (i.e., a network-specific AID), so that a payment transaction conducted using the payment application may be routed using a specific payment processing network.

At step 506, if an alternate AID does not exist and/or if an alternate AID is not supported by the access device 150, the access device 150 conducts a transaction using the common debit AID.

At step 507, if an alternate AID exists for the payment application, the multiple application selection module 153 of the access device 150 selects both the primary AID and the alternate AID. Accordingly, the multiple AID selection/determination process is completed and the multiple application selection module 153 of the access device 150 may perform a multiple transaction preparation and initiation process.

B. Exemplary Multiple Transaction Preparation and Initiation Process

Figure 6:
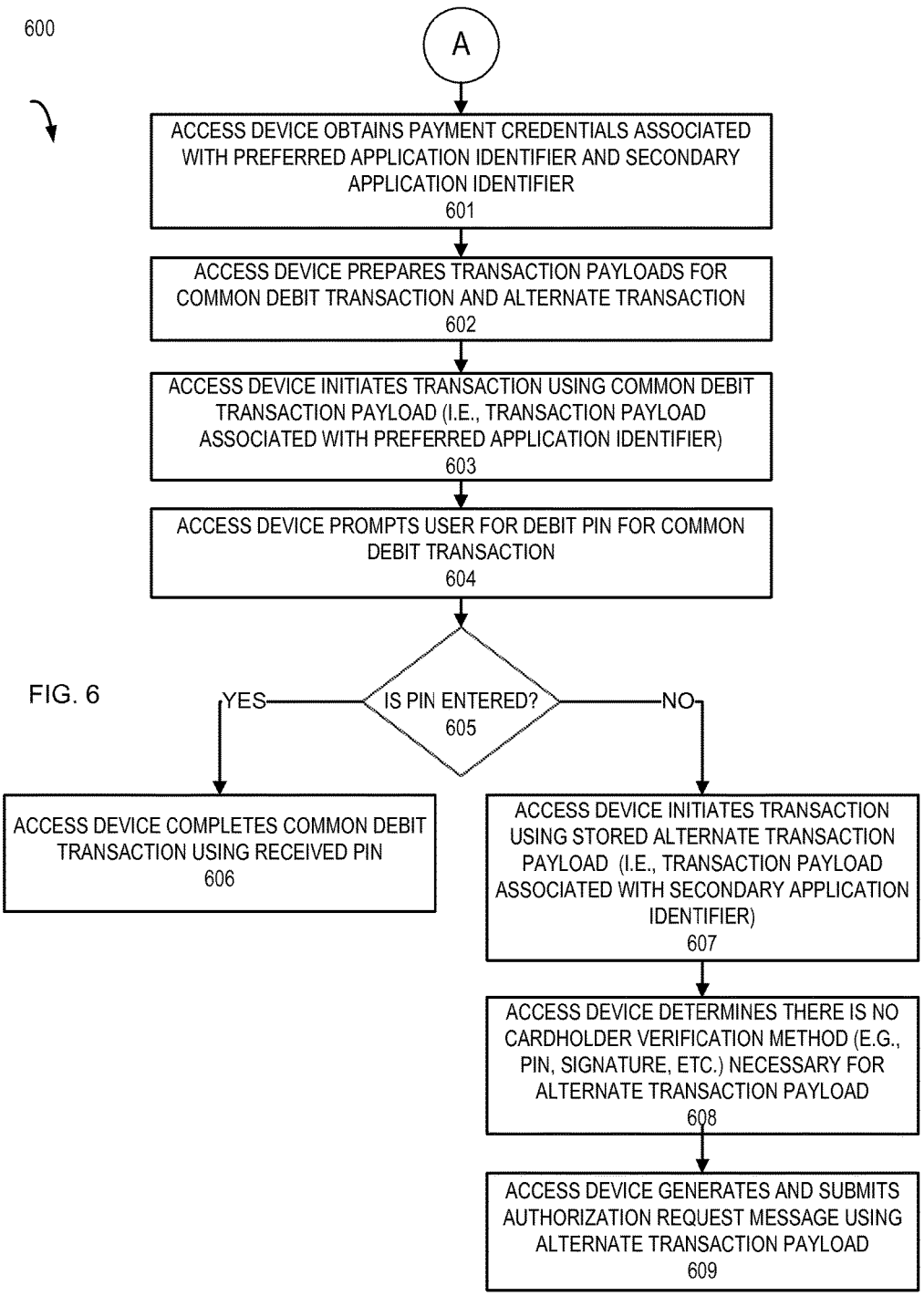
FIG. 6 shows a flow diagram of an exemplary method of conducting a transaction using multiple application identifiers including the steps for preparing and initiating a transaction payload associated with an alternate application identifier (i.e., secondary application identifier).

FIG. 6 shows a flow diagram of an exemplary method of processing the transaction associated with the example provided in FIG. 5 described above. The exemplary process includes a method of conducting a transaction using multiple AIDs where one of the AIDs is associated with a common debit AID. For example, the preferred transaction payload is prepared using payment credentials associated with a common debit AID. FIG. 6 shows the steps for preparing and initiation a transaction payload associated with an alternate AID (i.e., secondary AID). The method of FIG. 6 is illustrative only and provides an exemplary transaction processing flow where the access device 150 determines that both a common debit AID and an alternate AID are supported by the access device 150 and the mobile device 110.

Figure 7:
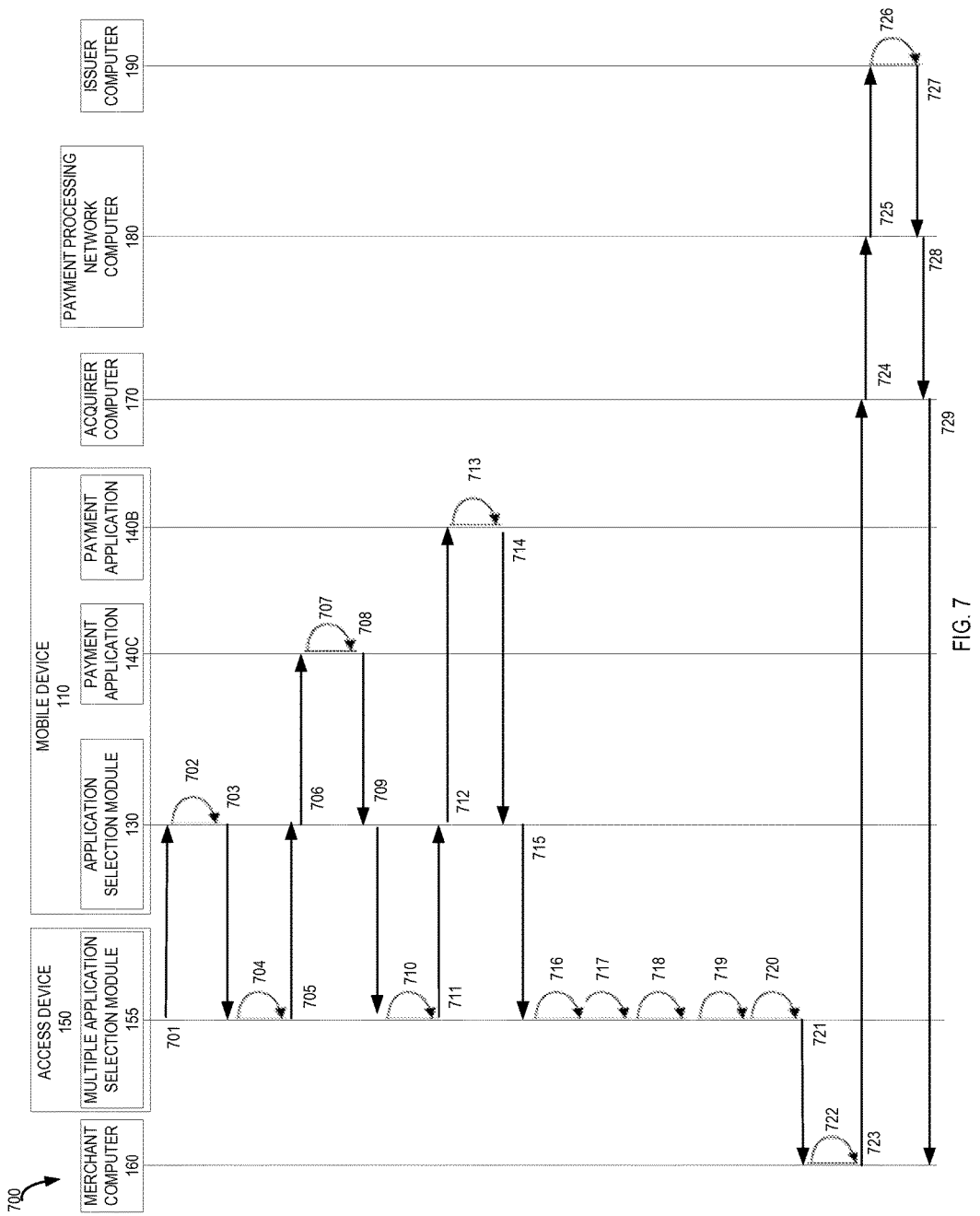
FIG. 7 shows a flow diagram of an exemplary method of performing a payment transaction, according to an embodiment of the invention.

At step 601, the multiple application selection module 153 of the access device 150 may obtain payment credentials associated with both the preferred AID and the alternate AID. As will be described in further detail below in reference to FIG. 7, the access device 150 may obtain payment information for each of the selected payment applications using a single request (not shown in FIG. 7) or may send a separate request for each selected payment application (as shown in FIG. 7). Additional details regarding obtaining payment credentials for the selection preferred and/or alternate AID may be found above in reference to step 302-303 of FIG. 4.

At step 602, the access device 150 prepares transaction payloads for the payment credentials and/or transaction processing information received for both the preferred AID and the alternate AID. The access device 150 may store the alternate transaction payload to use in a future transaction if the preferred transaction cannot or should be completed. Additional details regarding the preparation of the preferred and/or alternate transaction payload may be found above in reference to steps 403-405 of FIG. 4.

At step 603, the access device 150 initiates a common debit transaction using the preferred transaction payload associated with the common debit AID. Accordingly, the access device 150 may attempt to complete the common debit AID transaction. If the common debit transaction is successful, the alternate transaction payload stored in the access device 150 may be deleted. However, if the common debit transaction fails for any reason, access device 150 may automatically initiate a transaction using the secondary transaction payload without any additional action from the user or the mobile device 110. Additional details regarding the initiation of the preferred transaction may be found above in reference to step 406 of FIG. 4.

At step 604, the access device 150 prompts the user for a PIN associated with the user's debit account. The access device 150 may receive the PIN in any suitable manner. For example, the access device 150 may include a keypad for manual entry of the PIN. The access device 150 may also receive the PIN from the mobile device 110 (e.g., through wireless communication). The user may have the option of cancelling the transaction or refusing to provide a PIN (e.g., if the user feels they are being watched or does not want to input a PIN for the transaction). For example, the user may press the "Cancel" button on a keypad of the access device 150. Additionally, in some embodiments, the access device 150 may display that alternative transactions are available with different CVM methods and the consumer may choose one or more alternative transactions through the access device 150.

At step 603, the access device 150 determines whether the PIN was successfully entered. In some embodiments, the PIN may successfully be entered when any input other than a cancel or alternative processing option is provided by the consumer. For example, the consumer may not be able to avoid authenticating themselves after an incorrect PIN is entered. However, in other embodiments, if an incorrect PIN is entered, the access device 150 may still allow the alternative transaction to be processed. For instance, where the secondary transaction has a similar CVM method as the preferred transaction and/or if the CVM is above a certain threshold, the consumer may be able to initiate the alternate transaction. Further, in some embodiments, the CVM method may not be analyzed and the alternate transaction may be initiated no matter the reason for the first transaction not being completed.

At step 606, if the PIN was successfully entered, the access device 150 may complete processing the common debit transaction using the received PIN. Completing the transaction may include any traditional transaction processing steps. For example, the entered PIN may be sent to an issuer computer 190 associated with the user's debit account so that the issuer computer 190 can verify the PIN and authorize the transaction.

At step 607, if the PIN was not successfully entered, the access device 150 may initiate a transaction using the alternate transaction payload. Initiating the alternate transaction may involve obtaining the alternate transaction payload stored in memory. The alternate transaction payload may include any relevant information for initiating a transaction. For example, the transaction payload may be stored along with or may include transaction processing information including, for instance, payment credentials, cryptogram data, and cardholder verification method (CVM) data associated with the alternate transaction. Thus, the access device 150 may obtain the transaction payload from the stored memory, may determine the CVM for the transaction (e.g., passcode, PIN, signature, none, etc.), and may request a CVM input (or other authentication input) where appropriate.

At step 608, the transaction initiation module 156 of the access device 150 determines that the alternate transaction payload does not require a PIN or other user input for the CVM (e.g., because there is no CVM for the alternate payment application). Accordingly, the transaction processing of the alternate transaction payload continues.

At step 609, the transaction initiation module 156 of the access device 150 generates and submits an authorization request message using the alternate transaction payload. Accordingly, the alternate transaction may be processed and thus, an alternate transaction was performed by the access device 150 without requiring additional communication between the mobile device 110 and the access device 150. Additionally, a new transaction did not have to be originated by the merchant and the consumer.

Accordingly, an exemplary process for selecting, preparing, and initiating multiple transactions using multiple AIDs for a single interaction between a mobile device 110 and an access device 150 has been completed. However, embodiments are not limited to the common debit AID criteria provided above and multiple AIDs may be selected for any number of reasons which have been discussed herein and which one or ordinary skill would recognize.

Additionally, note that although the description provided herein focuses on selection of a preferred AID and an alternate AID, embodiments of the invention may include selection, preparation, and initiation of transactions using any number of alternate, backup, or fallback AIDs. For example, if a payment application and access device 150 support five AIDs, a priority ordering may be determined for the various AIDs (e.g., AID 3, AID 2, AID 4, AID 5, AID 1) and an access device 150 may initiate a transaction for each of the five AIDs in order based on the determined priority. If the transaction associated with the highest priority AID (e.g., AID 3) fails, then the access device 150 may initiate a transaction using a transaction payload associated with the next highest priority AID (e.g., AID 2), and continue to attempt to complete the next highest priority AID until a transaction is successful.

C. Exemplary Method of Transaction Processing Using Multiple AIDs

Furthermore, FIG. 7 shows an exemplary flowchart of a method of performing a payment transaction according to an embodiment of the invention. Most of the steps shown in FIG. 7 have been described above in reference to FIGS. 1-5 so in the interest of brevity the explanation of each step may be brief. However, the description of the steps provided in FIGS. 1-5 should be referenced to obtain additional details regarding details for the steps of FIG. 7.

At step 701, the multiple application selection module 153 of the access device 150 sends a request for the available payment applications of the mobile device 110. As described above, in one embodiment, the available payment application request may include a request for a PPSE. Additional information regarding the available AID request message may be found above in reference to FIG. 4.

At step 702, the application selection module 130 of the mobile device 110 receives the request for available AIDs, determines the available applications and their corresponding AIDs, and returns a list of available AIDs to the access device 150. As described above, the list of AIDs may include applications that have an active status and are ready to initiate a transaction. Accordingly, the application selection module 130 of the mobile device 110 may respond with the list of available AIDs.

Further, as explained above in reference to FIG. 4, the list of available AIDs may include additional application information including tags (e.g., issuer identifier, payment processing network identifier, etc.), configuration options of the associated application (e.g., CVM indicators), and any other relevant information to a pre-selection or AID selection process.

At step 703, the application selection module 130 of the mobile device 110 sends an available applications response including the list of available AIDs to the access device 150. The list of available AIDs may be sent in any suitable manner. For example, as explained above in reference to FIG. 4, in some embodiments, the list of available AIDs may be sent in the form of a "select PPSE" response and may include PPSE file control information (FCI). For instance, the available applications response may include a directory entry for each available AID. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available applications response may also include other data such as FCI issuer discretionary data.

At step 704, the multiple application selection module 153 of the access device 150 may perform a pre-selection and/or any other AID determination processing for determining one or more supported AIDs from the list of available payment applications provided by the mobile device 110 for the transaction. Any number of steps may be performed in order to obtain two or more AIDs to be used in processing the transaction and the two or more AIDs may be selected for a variety of reasons.

For example, the AIDs may be selected because they are the two highest priority AIDs that are supported, they provide the highest transaction security, one application provides higher security than the other but is not the highest priority application so the consumer will be prompted during transaction processing to make a decision between applications, etc. Further, both AIDs may be associated with the same card, account, and/or payment credentials but will be processed differently and thus, the consumer may be given a choice regarding processing options for the same card information. For instance, the consumer may be able to select an application based on configuration options including processing networks (e.g., Visa vs. MasterCard), CVM methods (e.g., online PIN vs. Signature), card types (e.g., debit vs. credit), etc., for processing a transaction using the same network-generic card information (associated with multiple payment applications but the same underlying account). Additional information regarding the pre-selection process may be found above in reference to step 402 of FIG. 4.

Accordingly, the multiple application selection module 153 may select and/or determine two or more AIDs for processing the transaction. In some embodiments, the multiple application selection module 153 may only select a single application at a time from the mobile device 110. As such, in some embodiments, the multiple application selection module 153 may store and/or cache the selected AIDs and may select a first AID with the mobile device 110. Thereafter, after the mobile device 110 returns the payment credentials and/or transaction processing information associated with the first selected AID, the multiple application selection module 153 may repeat the selection process for the second AID. This process may be repeated for each of the selected AIDs.

Although not shown in FIG. 7, in some embodiments, each of the selected AIDs may be provided to the mobile device 110 in a single application selection message and the application selection module 130 of the mobile device 110 may manage the generation, storage, and delivery of the payment credentials and transaction processing information associated with each of the selected applications to the multiple application selection module 153 of the access device 150. Furthermore, more than two AIDs may be selected during this process and any number of AIDs provided to the mobile device 110 for selection and obtaining of payment credentials associated with an application on the mobile device 110.

Further, note that additional messages may be sent back and forth between the access device 150 and the mobile device 110 before, during, or after application selection which may not be shown in FIG. 7. For example, as explained above, in one embodiment, a GPO request message and GPO response message may be sent to and from the access device 150 in order to obtain transaction information to assist in generating the correct transaction information, payment credentials, dynamic verification information, etc. Additionally, in some embodiments, application data requests and responses may be sent before and after application selection to obtain configuration parameters, perform issuer updates of the mobile device 110, etc. These communications are not shown in the flow diagram of FIG. 7 but it should be understood that such steps could easily be incorporated into some embodiments of the invention.

At step 705, the multiple application selection module 153 of the access device 150 sends a first application selection message to the mobile device 110 including the first AID (i.e., preferred AID, primary AID, etc.) in order to obtain transaction processing information and/or payment credentials associated with the first AID. The first application selection message may include any other information that allows the application selection module 130 of the mobile device 110 to prepare the transaction processing information or any number of other messages may be passed between the access device 150 and the mobile device 110 to obtain any requisite information. For example, as described above in reference to step 303 of FIG. 4, a number of requests and responses may be sent back and forth at this point to obtain the relevant transaction information for generation of a cryptogram, validation of restrictions associated with the application, and any other processing related to using account credentials associated with a payment application for processing a transaction.

At step 706, the application selection module 130 of the mobile device 110 receives the application selection message, determines the selected mobile payment application associated with the first AID, and requests the payment credentials and any other transaction processing information from the payment application. The application selection module 130 may request payment credentials and transaction processing information from the identified payment application using any suitable application programming interfaces (APIs) and/or commands. Additional information may be found in step 403 of FIG. 4 above.

At step 707, the first priority mobile payment application 140C receives the request for payment credentials and/or transaction processing information stored in the payment application, determines if the mobile application has access rights to the sensitive information, and generates any dynamic or transaction-specific information for the transaction. For example, the mobile payment application 140C may generate a dynamic cryptogram, obtain account information stored in a secure domain for the payment application, and/or perform any other processes specific to the payment application for processing of a transaction using payment credentials associated with the payment application 140C.

At step 708, the first payment application 140C responds with the payment credentials and/or transaction processing information associated with the payment application to the application selection module 130.

At step 709, the application selection module 130 of the mobile device 110 forwards the payment credentials and/or transaction processing information to the access device 150. The information may be provided using any suitable communication protocol and/or format.

In some embodiments, the payment credentials and transaction processing information may be sent from the mobile device 110 as a transaction payload such that the information may be forwarded as an ISO message to the merchant computer 160 without requiring additional processing. However, typically, the payment credentials and transaction processing information may be in a format specific to the short-range communication and a transaction payload may be generated by parsing the payment credentials and transaction processing information from the payment information and reformatting as a transaction payload that is configured to be processed by a payment network.

At step 710, the multiple application selection module 153 of the access device 150 receives payment information associated with the first AID (i.e., preferred AID) from the mobile device 110. The payment information may include the first payment credentials associated with the first AID. The transaction preparation module 155 of the access device 150 may prepare a first transaction payload using the received first payment credentials. In some embodiments, the transaction preparation module 155 may cache or store the first transaction payload in a memory until all of transaction payloads are prepared. In other embodiments, the transaction initiation module 156 may begin the transaction processing steps simultaneously with the selection of the secondary AID (not shown).

At step 711, the multiple application selection module 153 of the access device 150 determines that the payment information associated with the first AID has been received and that the mobile device 110 can process a new application request. Accordingly, the multiple application selection module 153 sends a second application selection message to the mobile device 110 including the second AID (i.e., secondary AID, alternate AID) in order to obtain transaction processing information and/or payment credentials associated with the first AID.

At steps 712-715, the application selection module 130 and the secondary mobile payment application 140B of the mobile device 110 repeat similar processes to steps 706-710 in relation to the mobile payment application associated with the second AID.

At step 716, the multiple application selection module 153 of the access device 150 receives payment information associated with the second AID from the mobile device 110. The payment information may include payment credentials associated with the secondary AID. The transaction preparation module 155 of the access device 150 may prepare a second transaction payload using the received second payment credentials and other transaction information. The transaction preparation module 155 may also store the second transaction payload in a memory for future processing if the first transaction is not completed.

At step 717, the transaction initiation module 156 of the access device 150 initiates the first transaction using the first transaction payload. Initiating the first transaction may include any number of processes. For example, the transaction initiation module 156 may determine a cardholder verification method associated with the first payment credentials and request the determined cardholder verification method from the user. Additional information regarding this step may be found above in reference to step 406 of FIG. 4.

At step 718, the transaction initiation module 156 of the access device 150 may determine that the first transaction cannot or should not be completed. For example, a consumer may request to cancel the transaction, the merchant and/or access device 150 may determine there is a problem and cancel the transaction, the consumer may not enter a PIN or other authentication information within a specified period of time, and/or any other action may occur that indicates that the first transaction should not or cannot be completed. Additional information regarding this step may be found above in reference to step 407 of FIG. 4.

At step 719, the transaction initiation module 156 of the access device 150 may obtain the second transaction payload and may initiate the second transaction. Similar steps to those described above in reference to step 717 may be performed for the second transaction payload. For example, the transaction initiation module 156 of the access device 150 may determine a cardholder verification method associated with the second payment credentials and may request a CVM input by the consumer. Additional information regarding this step may be found above in reference to step 408 of FIG. 4.

At step 720, the transaction initiation module 156 of the access device 150 determines that the second transaction can and should continue. For example, the consumer may provide the correct CVM, may agree to the transaction, may not cancel the transaction, and/or any other information or actions may be performed such that the transaction may be processed. Additional information regarding this step may be found above in reference to step 409 of FIG. 4.

At step 721, the transaction initiation module 156 of the access device 150 generates and/or submits an authorization request message including the transaction payload to a merchant computer 160 for submission to a payment processing network for processing.

At step 722, the merchant computer 160 may provide additional information and/or transaction information to the authorization request message that may be useful or required for processing the transaction.

At step 723, the merchant computer 160 may send the authorization request message to an acquirer computer 170 and/or payment processing network for transaction processing.

At step 724, the acquirer computer 170 receives the authorization request message and forwards the authorization request message to a payment processing network computer 180 associated with the account and/or payment credentials included in the authorization request message.

At step 725, the payment processing network computer 180 may receive the authorization request message and may determine an account issuer associated with the authorization request message. The payment processing network may then forward the authorization request message to the issuer for authorization of the transaction. Any number of additional processes including fraud analysis, authentication, risk analysis, and/or other actions may be performed by the payment processing network computer 180 (or any of the other computers associated with the authorization request message).

At step 726, the issuer computer 190 receives the authorization request message and determines whether the transaction should be authorized. The issuer may determine the account associated with the authorization request message, compare an account value or credit available in the account to the transaction amount, perform any number of fraud checks or risk analysis processes, and/or perform any other relevant actions to determine an appropriate authorization decision.

At step 727, the issuer computer 190 may determine an authorization decision and may generate an authorization response message including the authorization decision. The issuer computer 190 may send the authorization response message to the payment processing network computer 180 for completion and processing of the transaction.

At step 728, the payment processing network computer 180 may receive the authorization response message, log the authorization decision for settlement and clearance purposes, and send the authorization response message to the acquirer computer 170 for reporting to the merchant computer 160 and/or access device 150. In some embodiments, the payment processing network computer 180 may also send a notification to the portable communication device 110 including the authorization decision.

At step 729, the acquirer computer 170 receives the authorization response message and forwards the authorization response message to the merchant computer 160 for completion of the transaction. The acquirer computer 170 may log the authorization decision and/or perform any other functions related to the transaction.

At step 730, the merchant computer 160 receives the authorization response message and completes the transaction based on the authorization decision of the authorization response message. For example, the merchant may provide a good or service if the authorization response message includes an indication of an accepted transaction and may decline to provide a good or service when receiving a declined authorization decision. Although not shown, the merchant computer 160 may provide the authorization response message to the access device 150 and subsequently to the portable communication device 110 for reporting to the payment application and the consumer.

IV. System Devices

The various participants and elements described herein with reference to FIGS. 1-2 may operate one or more computer apparatuses to facilitate the functions described herein. Any of the elements in FIGS. 1-2, including any servers or databases, may use any suitable number of subsystems to facilitate the functions described herein.

Figure 8:
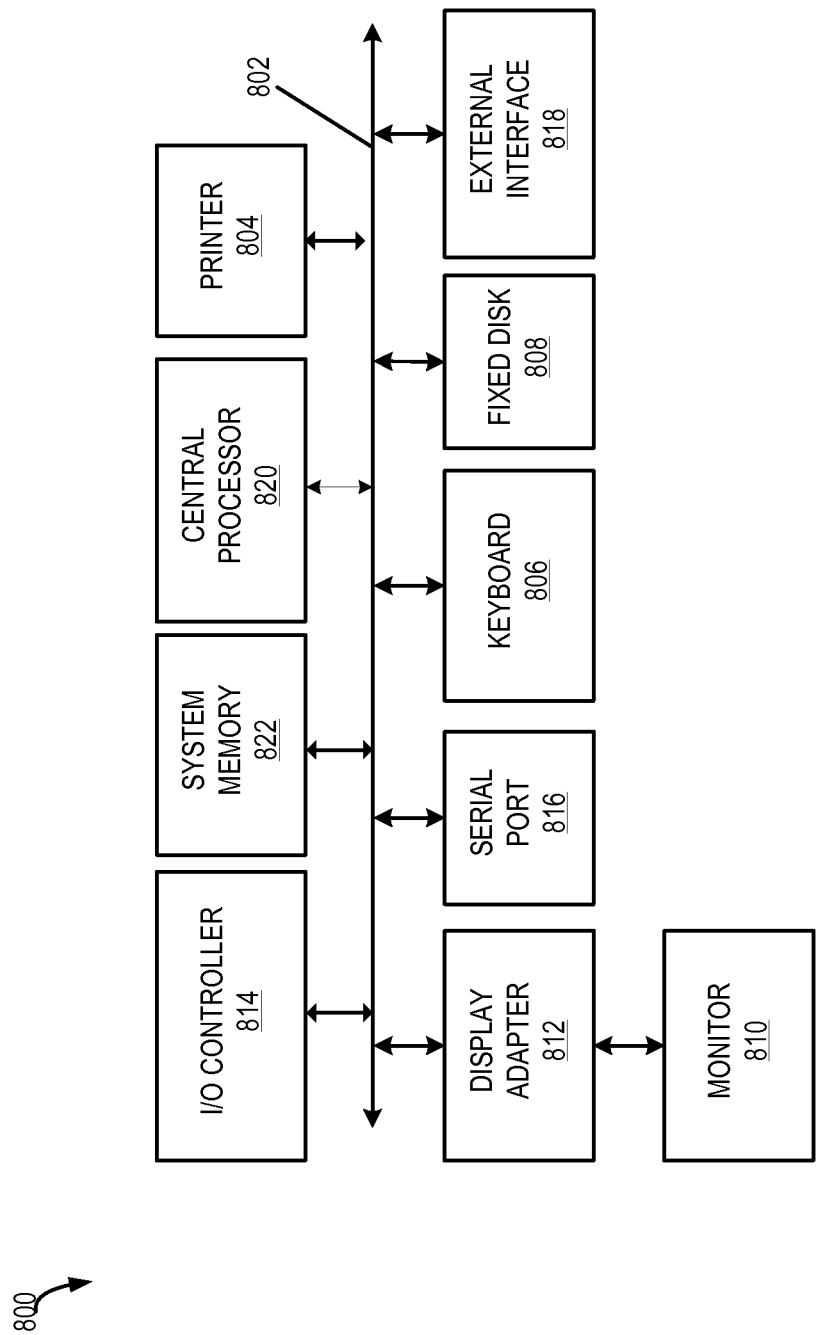
FIG. 8 is a block diagram of a computer apparatus that may be used to implement embodiments disclosed herein, according to an embodiment of the invention.

Examples of such subsystems or components are shown in FIG. 8. The subsystems shown in FIG. 8 are interconnected via a system bus 802. Additional subsystems such as a printer 804, keyboard 806, fixed disk 808 (or other memory comprising computer readable media), monitor 810, which is coupled to display adapter 812, and others are shown. Peripherals and input/output (I/O) devices, which couple to I/O controller 815 (which can be a processor or other suitable controller), can be connected to the computer system by any number of means known in the art, such as serial port 816. For example, serial port 816 or external interface 818 can be used to connect the computer apparatus to a wide area network such as the Internet, a mouse input device, or a scanner. The interconnection via system bus allows the central processor 820 to communicate with each subsystem and to control the execution of instructions from system memory 822 or the fixed disk 808, as well as the exchange of information between subsystems. The system memory 822 and/or the fixed disk 808 may embody a computer readable medium.

Figure 9:
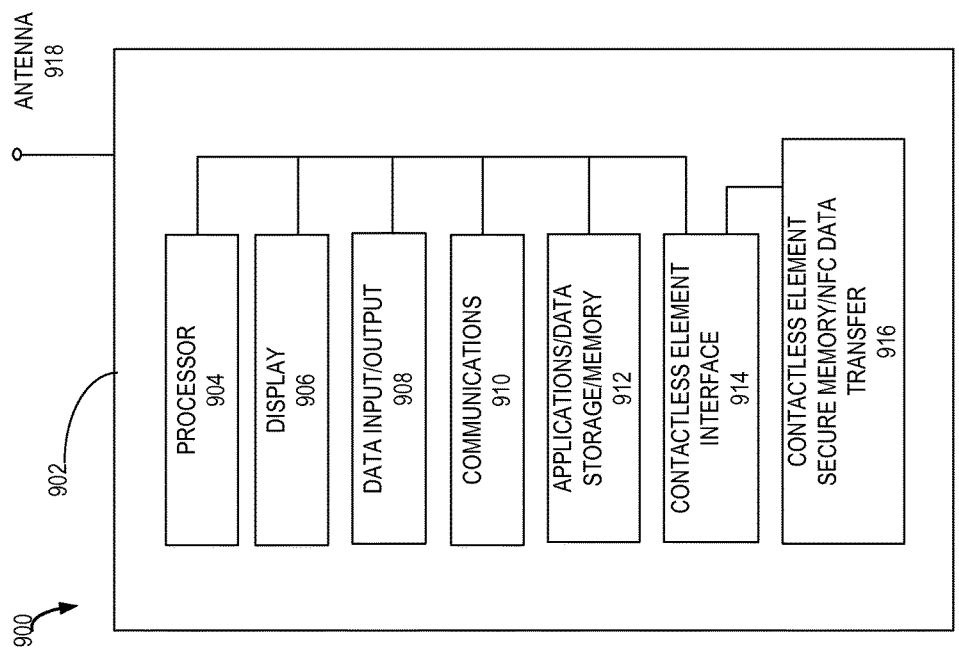
FIG. 9 is a block diagram of a mobile device that may be used to implement embodiments disclosed herein, according to an embodiment of the invention.

FIG. 9 is a functional block diagram illustrating a mobile communication device that may be used to perform mobile banking operations, such as initiating transactions and receiving and displaying transaction alerts, in accordance with some embodiments of the present invention. Mobile communication device 902 may include circuitry that is used to enable certain device functions, such as telephony. The functional elements responsible for enabling those functions may include a processor 904 that is programmed to execute instructions that implement the functions and operations of the device. Processor 904 may access data storage 912 (or another suitable memory region or element) to retrieve instructions or data used in executing the instructions. Data input/output elements 908 may be used to enable a user to input data (via a microphone or keyboard, for example) or receive output data (via a speaker, for example). Display 906 may also be used to output data to a user. Communications element 910 may be used to enable data transfer between device 902 and a wireless network (via antenna 918, for example) to assist in enabling telephony and data transfer functions. Device 902 may also include contactless element interface 914 to enable data transfer between contactless element 916 and other elements of the device, where contactless element 916 may include a secure memory and a near field communications data transfer element (or another form of short range communications technology). As noted, a mobile phone or similar device is an example of a mobile communication device that may be used to display alerts as described with reference to embodiments of the present invention. However, other forms or types of devices may be used without departing from the underlying concepts of the invention. Further, devices that are used to display alerts may not require the capability to communicate using a cellular network in order to be suitable for use with embodiments of the present invention.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by an access device, during a short range communication session with a mobile device, a plurality of application identifiers from the mobile device, wherein the plurality of application identifiers are associated with two or more payment applications associated with two or more payment credentials provisioned on the mobile device;
   determining, by the access device, that a first application associated with a first application identifier and a second application associated with a second application identifier from the plurality of application identifiers are supported by the access device;
   preparing, by the access device, a first transaction payload including first payment credentials associated with the first application and a second transaction payload including second payment credentials associated with the second application;
   subsequent to preparing the first transaction payload and the second transaction payload, initiating, by the access device, a first transaction using the first transaction payload by attempting to authenticate a user of the mobile device using a first cardholder verification method associated with the first application;
   storing, by the access device, the second transaction payload in a temporary memory;
   determining, by the access device, that the first transaction cannot be completed because the first cardholder verification method could not be completed;
   completing, by the access device, the short range communication session with the mobile device; and
   subsequently, based on determining that the first transaction cannot be completed, initiating, by the access device, a second transaction using the stored second transaction payload from the temporary memory by attempting to authenticate the user of the mobile device using a second cardholder verification method associated with the second application, wherein no additional short range communication between the access device and the mobile device is required prior to initiating the second transaction.

2. The method of claim 1, wherein preparing the first transaction payload and the second transaction payload comprises:
   sending, by the access device, a first application selection message to the mobile device, the first application selection message including the first application identifier;
   receiving, by the access device, payment information associated with the first application identifier from the mobile device, the payment information including the first payment credentials associated with the first application identifier;
   sending, by the access device, a second application selection message to the mobile device, the second application selection message including the second application identifier;
   receiving, by the access device, payment information associated with the second application identifier from the mobile device, the payment information including the second payment credentials associated with the second application identifier; and
   preparing, by the access device, the first transaction payload using the first payment credentials and the second transaction payload using the second payment credentials.

3. The method of claim 1, wherein initiating the first transaction using the first transaction payload further comprises:
   determining, by the access device, a cardholder verification method associated with the first payment credentials; and
   performing, by the access device, the determined cardholder verification method with the user of the mobile device.

4. The method of claim 1, wherein initiating the second transaction using the second transaction payload further comprises:
   determining, by the access device, a cardholder verification method associated with the second payment credentials, wherein the cardholder verification method does not require a user input; and
   submitting, by the access device, an authorization request message including the second transaction payload to a payment network.

5. The method of claim 1, wherein the first application identifier is associated with network-generic payment information and wherein the second application identifier is associated with network-specific payment information.

6. The method of claim 1, wherein the first application identifier and the second application identifier are associated with the same payment credentials and wherein the first application identifier and the second application identifier are associated with different cardholder verification methods.

7. The method of claim 1, wherein determining the first application and the second application comprises:
    determining, by the access device, supported application identifiers from the plurality of application identifiers,
    determining, by the access device, a first priority application identifier and a second priority application identifier from the supported application identifiers; and
    selecting the first priority application identifier as the first application identifier and the second priority application identifier as the second application identifier.

8. The method of claim 1, wherein determining that the first transaction cannot be completed includes determining that a cardholder verification method input is not received by the access device in a predetermined period of time.

9. The method of claim 1, wherein determining that the first transaction cannot be completed includes receiving an input from a consumer indicating a preference for initiating the second transaction.

10. The method of claim 1, wherein the short range communication session is an NFC (near field communication) communication.

11. An access device comprising:
    a processor;
    a computer-readable medium coupled to the processor, the computer-readable medium comprising code stored thereon, executable by the processor, and configured for performing a method of processing a transaction initiated by a mobile device, the method comprising:
    receiving, during a short range communication session with the mobile device, a plurality of application identifiers from the mobile device, wherein the plurality of application identifiers are associated with two or more payment applications associated with two or more payment credentials provisioned on the mobile device;
    determining that a first application associated with a first application identifier and a second application associated with a second application identifier from the plurality of application identifiers are supported by the access device;
    preparing a first transaction payload including first payment credentials associated with the first application and a second transaction payload including second payment credentials associated with the second application;
    subsequent to preparing the first transaction payload and the second transaction payload, initiating a first transaction using the first transaction payload by attempting to authenticate a user of the mobile device using a first cardholder verification method associated with the first application;
    storing the second transaction payload in a temporary memory;
    determining that the first transaction cannot be completed because the first cardholder verification method could not be completed;
    completing the short range communication session with the mobile device; and
    subsequently, based on determining that the first transaction cannot be completed, initiating a second transaction using the stored second transaction payload from the temporary memory by attempting to authenticate the user of the mobile device using a second cardholder verification method associated with the second application, wherein no additional short range communication between the access device and the mobile device is required prior to initiating the second transaction.

12. The access device of claim 11, wherein preparing the first transaction payload and the second transaction payload comprises:
    sending, by the access device, a first application selection message to the mobile device, the first application selection message including the first application identifier;
    receiving, by the access device, payment information associated with the first application identifier from the mobile device, the payment information including the first payment credentials associated with the first application identifier;
    sending, by the access device, a second application selection message to the mobile device, the second application selection message including the second application identifier;
    receiving, by the access device, payment information associated with the second application identifier from the mobile device, the payment information including the second payment credentials associated with the second application identifier; and
    preparing, by the access device, the first transaction payload using the first payment credentials and the second transaction payload using the second payment credentials.

13. The access device of claim 11, wherein initiating the first transaction using the first transaction payload further comprises:
    determining, by the access device, a cardholder verification method associated with the first payment credentials; and
    performing, by the access device, the determined cardholder verification method with the user of the mobile device.

14. The access device of claim 11, wherein initiating the second transaction using the second transaction payload further comprises:
    determining, by the access device, a cardholder verification method associated with the second payment credentials, wherein the cardholder verification method does not require a user input; and
    submitting, by the access device, an authorization request message including the second transaction payload to a payment network.

15. The access device of claim 11, wherein the first application identifier is associated with network-generic payment information and wherein the second application identifier is associated with network-specific payment information.

16. The access device of claim 11, wherein the first application identifier and the second application identifier are associated with the same payment credentials and wherein the first application identifier and the second application identifier are associated with different cardholder verification methods.

17. The access device of claim 11, wherein determining the first application and the second application comprises:
    determining, by the access device, supported application identifiers from the plurality of application identifiers, determining, by the access device, a first priority application identifier and a second priority application identifier from the supported application identifiers; and selecting the first priority application identifier as the first application identifier and the second priority application identifier as the second application identifier.

18. The access device of claim 11, wherein determining that the first transaction cannot be completed includes determining that a cardholder verification method input is not received by the access device in a predetermined period of time.

19. The access device of claim 11, wherein determining that the first transaction cannot be completed includes receiving an input from a consumer indicating a preference for initiating the second transaction.

20. A system for processing payment transactions initiated by a mobile device communicating with an access device, the system comprising:

the mobile device configured to:
send, during a short range communication session with the access device, a plurality of application identifiers to the access device, the plurality of application identifiers being associated with two or more payment applications associated with two or more payment credentials stored on the mobile device; and the access device configured to:
receive, via the short range communication session, the plurality of application identifiers from the mobile device;
determine that a first application associated with a first application identifier and a second application associated with a second application identifier from the plurality of application identifiers are supported by the access device;
prepare a first transaction payload including payment credentials associated with the first application and a second transaction payload including payment credentials associated with the second application;
subsequent to preparing the first transaction payload and the second transaction payload, initiate a first transaction using the first transaction payload by attempting to authenticate a user of the mobile device using a first cardholder verification method associated with the first application;
store the second transaction payload in a temporary memory;
determine that the first transaction cannot be completed because the first cardholder verification method could not be completed;
complete the short range communication session with the mobile device; and
subsequently, based on determining that the first transaction cannot be completed, initiate a second transaction using the second transaction payload from the temporary memory by attempting to authenticate the user of the mobile device using a second cardholder verification method associated with the second application, wherein no additional short range communication between the access device and the mobile device is required prior to initiating the second transaction.

* * * * *